(12) United States Patent
Sewak et al.

(10) Patent No.: US 12,197,486 B2
(45) Date of Patent: Jan. 14, 2025

(54) AUTOMATIC LABELING OF TEXT DATA

(71) Applicant: MICROSOFT TECHNOLOGY LICENSING, LLC, Redmond, WA (US)

(72) Inventors: Mohit Sewak, Pune (IN); Ravi Kiran Reddy Poluri, Samammish, WA (US); William Blum, Bellevue, WA (US); Pak On Chan, Seattle, WA (US); Weisheng Li, Bothell, WA (US); Sharada Shirish Acharya, Seattle, WA (US); Christian Rudnick, Seattle, WA (US); Michael Abraham Betser, Kirkland, WA (US); Milenko Drinic, Kenmore, WA (US); Sihong Liu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 104 days.

(21) Appl. No.: 17/711,506

(22) Filed: Apr. 1, 2022

(65) Prior Publication Data

US 2022/0414137 A1 Dec. 29, 2022

(30) Foreign Application Priority Data

Jun. 29, 2021 (IN) .............................. 202141029147

(51) Int. Cl.
*G06F 16/30* (2019.01)
*G06F 16/332* (2019.01)
(Continued)

(52) U.S. Cl.
CPC .......... *G06F 16/383* (2019.01); *G06F 16/332* (2019.01); *G06F 16/35* (2019.01); *G06F 16/953* (2019.01)

(58) Field of Classification Search
CPC .. G06F 16/313; G06F 16/332; G06F 16/3344; G06F 16/3346; G06F 16/35;
(Continued)

(56) References Cited

U.S. PATENT DOCUMENTS 6,697,998 B1 * 2/2004 Damerau .............. G06F 16/355
715/260
2018/0052928 A1 2/2018 Liu et al.
(Continued)

OTHER PUBLICATIONS

"International Search Report and Written Opinion Issued in PCT Application No. PCT/US22/030464", Mailed Date: Sep. 2, 2022, 11 Pages.
(Continued)

*Primary Examiner* — Mahesh H Dwivedi
(74) *Attorney, Agent, or Firm* — Shook, Hardy & Bacon L.L.P.

(57) ABSTRACT

The technology described herein determines whether a candidate text is in a requested class by using a generative model that may not be trained on the requested class. The present technology may use of a model trained primarily in an unsupervised mode, without requiring a large number of manual user-input examples of a label class. The may produce a semantically rich positive example of label text from a candidate text and label. Likewise, the technology may produce from the candidate text and the label a semantically rich negative example of label text. The labeling service makes use of a generative model to produce a generative result, which estimates the likelihood that the label properly applies to the candidate text. In another aspect, the technology is directed toward a method for obtaining a semantically rich example that is similar to a candidate text.

20 Claims, 16 Drawing Sheets

(51) Int. Cl.
  G06F 16/35 (2019.01)
  G06F 16/383 (2019.01)
  G06F 16/953 (2019.01)
(58) Field of Classification Search
  CPC ...... G06F 16/383; G06F 16/953; G06F 40/30; G06N 3/045; G06N 3/0475; G06N 3/096
  See application file for complete search history.

(56) References Cited

U.S. PATENT DOCUMENTS

| 2020/0034752 | A1* | 1/2020 | Luo | G06Q 10/107 |
| 2021/0240781 | A1* | 8/2021 | Horesh | G06F 16/90344 |
| 2022/0019730 | A1* | 1/2022 | Sharma | G06N 20/00 |

OTHER PUBLICATIONS

"Automatic Data Labeller", Retrieved from: https://autodatalabeller.azurewebsites.net/, Retrieved Date: May 6, 2020, 2 Pages.

"GPT-3", Retrieved from: https://en.wikipedia.org/wiki/GPT-3#:~:text=Generative%20Pre-trained%20Transformer%203%20%28GPT-3%29%20is%20an%20autoregressive,OpenAI%2C%20a%20San%20Francisco-based%20artificial%20intelligence%20research%20laboratory, May 24, 2021, 6 Pages.

"Introducing Vector Machine Learning (VML)", Retrieved from: https://help.symantec.com/cs/DLP15.7/DLP/v40065952_v133697641/Introducing-Vector-Machine-Learning-(VML)?locale=EN_US, Retrieved Date: May 6, 2020, 2 Pages.

"Introduction to Forcepoint DLP Machine Learning", Retrieved from: https://www.websense.com/content/support/library/data/v84/machine_learning/machine_learning.pdf, Retrieved Date: May 6, 2020, 9 Pages.

Hosein, Stefan, "Active Learning: Curious AI Algorithms", Retrieved from: https://www.datacamp.com/community/tutorials/active-learning, Feb. 9, 2018, 17 Pages.

Ratner, et al., "Weak Supervision: A New Programming Paradigm for Machine Learning", Retrieved from: http://ai.stanford.edu/blog/weak-supervision/, Mar. 10, 2019, 5 Pages.

Vincent, James, "OpenAI's text-generating system GPT-3 is now spewing out 4.5 billion words a day", Retrieved from: https://www.theverge.com/2021/3/29/22356180/openai-gpt-3-text-generation-words-day?scrolla=5eb6d68b7fedc32c19ef33b4, Mar. 29, 2021, 3 Pages.

Brown, et al., "Language Models are Few-Shot Learners", In Repository of arXiv:2005.14165v4, Jul. 22, 2020, pp. 1-75.

Mondal, et al., "Supervised Text Classification Using Text Search", In Respiratory of arXiv preprint arXiv:2011.13832, Nov. 30, 2020, pp. 1-6.

* cited by examiner

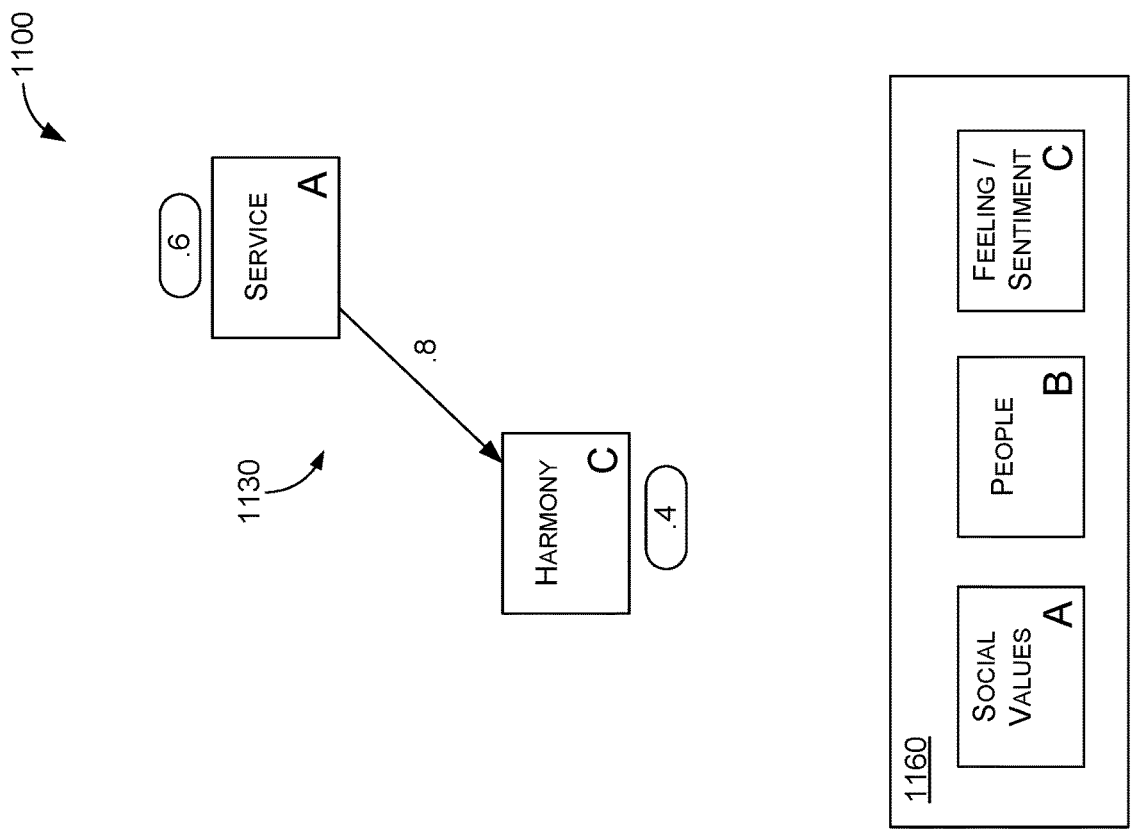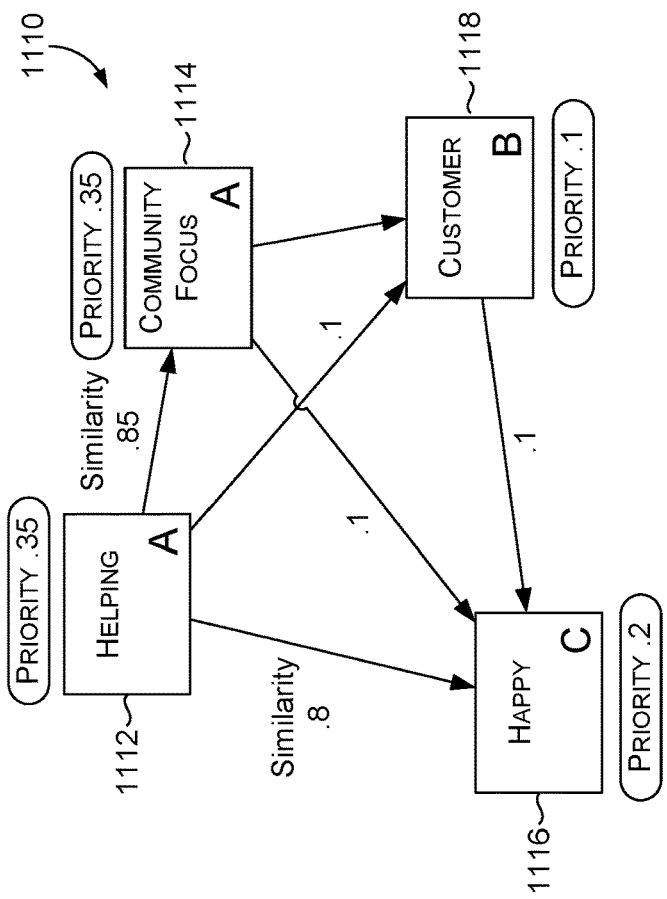
FIG. 11

AUTOMATIC LABELING OF TEXT DATA

CROSS-REFERENCE TO RELATED APPLICATIONS

This application claims priority to India Application No. 202141029147, filed 29 Jun. 2021, and entitled, "Automatic Labeling of Text Data."

BACKGROUND

The search technology of modern times has made great advances for simplicity and ease of use. However, as beneficial as these changes have been, they are generally limited in two important ways. First, these methods depend upon the user providing the right, concrete nouns or keywords to receive a set of results relevant to the subject, by finding the documents for which those keywords are used and have a high relevance. If the vocabulary and experience of the human who writes the query is limited, it can take hours of attempt and failure before the user finds out the nouns he should have been using from the beginning. If the user does not know the keywords that appear in the index of the subject that he would like to research, he is not likely to get results that are relevant to the subject without a painful process of trial and error.

Second, the search techniques that are commonly available generally only scratch the surface of relevant documents. Many documents that are more relevant may exist. However, these documents use different terminology, different vocabulary and expression. Therefore, these documents will not score as high in relevance to the query of the user.

These two limitations are partially the result of the failure of past attempts to label linguistic data. Methods that existed were not amenable to user-definition, they used taxonomies of nouns that were not necessarily known or meaningful to the user who performed the search. Manual labelling systems are developed at great amounts of processing power and cost to the user and they are not generally available to a search process or to an index of the search process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technology described herein determines whether a candidate text is in a requested class. The technology may perform this classification without any prior training data or model trained on the requested class. In fact, a user may specify the class as a natural language input, rather than selecting it from existing classes. The requested class does not need to follow a hierarchy or be predefined. The technology is effective even when the requested class is a concept, such as diversity, rather than a noun. The requested class may be described herein as a label.

Other text labelling systems have required some predefined minimum number of manual user-input examples and, in addition, have required a great deal of computer processing to perform supervised training of a label classifier. The present technology improves the state of the art by providing good performance while, for example, making use of a model trained primarily in an unsupervised mode, without requiring a large number of manual user-input examples of a label class. Because the input and computer training requirements of the labelling service are far less resource intensive than typical, the computerized system provides a technical improvement of requiring less computer processing to render a result.

The technology described herein provides this improved efficiency by receiving the candidate text and the label, and may produce from them a semantically rich positive example of label text. Likewise, a labelling service may produce from the candidate text and the label a semantically rich negative example of label text. The labeling service makes use of a generative model to produce a generative result, which estimates the likelihood that the label properly applies to the candidate text. The success rate of the classification can be improved, while maintaining this improved efficiency, by obtaining a second generative result from a generative model and estimating label probability using the second generative result.

In another aspect, the technology is directed toward a method for obtaining a semantically rich example that is similar to a candidate text. Other solutions to this problem have provided a semantically poor representation of the input data, or alternatively have relied upon vast amounts of manual data to provide training. The technology provides this improvement, for example, by obtaining a set of keywords that reflect the richness of the candidate text in the context of the label. The set of keywords are presented to a search service, and a text snippet from the search results with a good relevance rank is obtained to provide the example when the label class confidence of the extracted snippet is high.

In another aspect, the technology is directed toward a method of providing a semantically rich set of keywords from candidate text in the context of a label. Other solutions have been semantically poor in representation, and so the number of returns from a search engine that must be received to obtain a certain number of relevant results was large. The present technology improves the state of the art, for example, by providing good performance while producing a semantically rich set of keywords, thus reducing the amount of data required for training. A set of candidate text priority keywords are obtained from candidate text. A set of label priority keywords are obtained from the label. Priority keywords are assigned embedding vectors using a transformer-based model. Context-aware keywords are determined by similarity of the priority keywords based on the embedding vectors to obtain a set of context-aware keywords. This context-aware set of keywords allows for obtaining information from the search engine, which is semantically close to the candidate text in the context of the label, and therefore the amount of search processing required to return a certain number of relevant results is reduced.

BRIEF DESCRIPTION OF THE DRAWINGS

The technology described herein is illustrated by way of example and not limitation in the accompanying figures in which like reference numerals indicate similar elements and in which:

FIG. 11 is a representative display of a prioritized text keyword structure related to a prioritized label keyword structure, in accordance with an aspect of the technology described herein;

DETAILED DESCRIPTION

Figure 1:
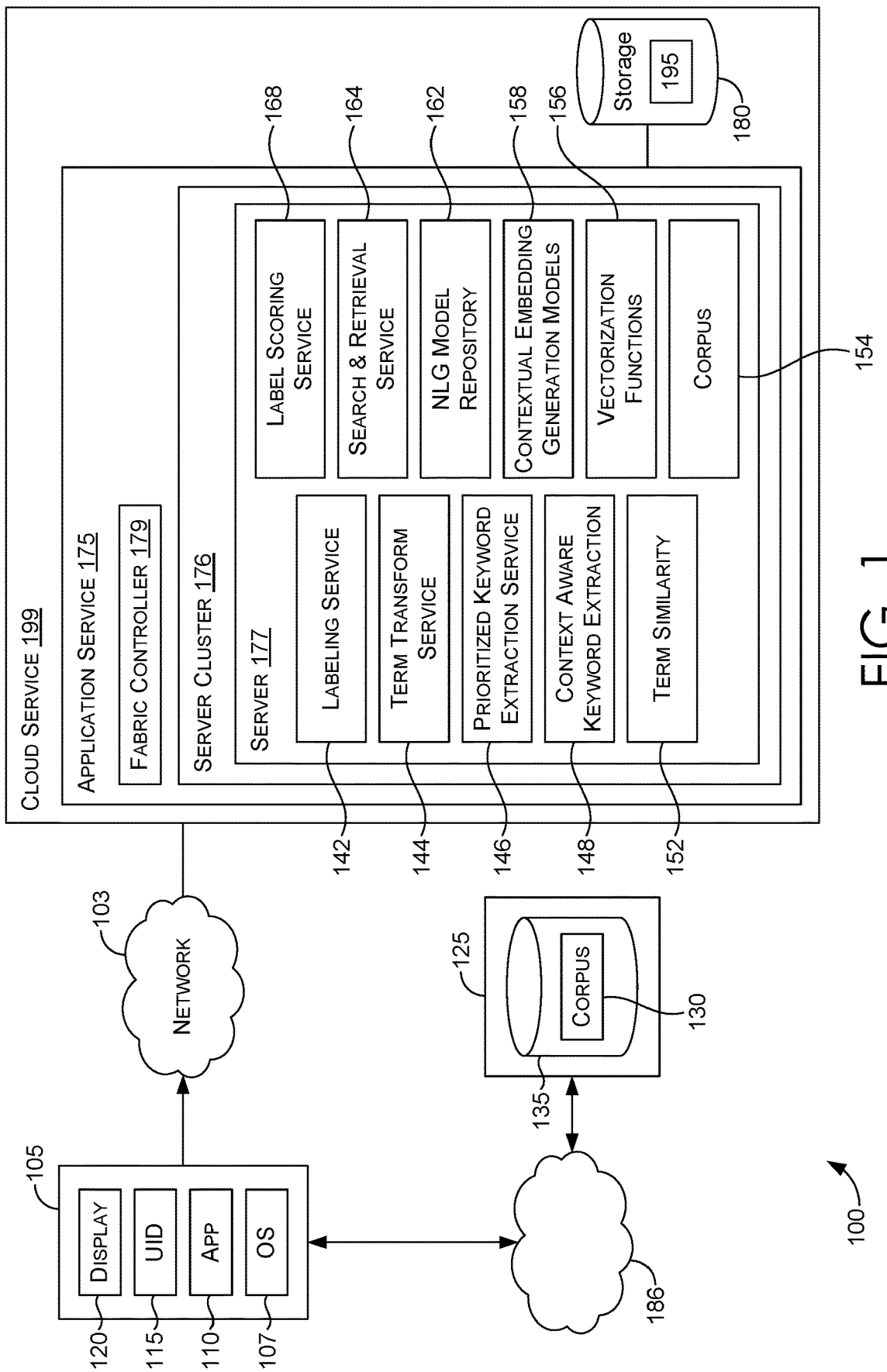
FIG. 1 is a block diagram of an example labelling system operating environment suitable for implementations of the present disclosure.

The various technology described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein determines whether a candidate text is in a requested class. The technology may perform this classification without any prior training data or model trained on the requested class. In fact, a user may specify the class as a natural language input, rather than selecting it from existing classes. The requested class does not need to follow a hierarchy or be predefined. The technology is effective even when the requested class is a concept, such as diversity, rather than a noun. The requested class may be described herein as a label.

A label classification system can provide feedback to a user indicating that candidate text likely fits or does not fit a user-defined label. For example, a business-writing assistant application could receive a user-defined class, such as "business-like communication that is pleasant to a customer." The candidate text could be word processing document. In this example, each sentence of the document can be evaluated as belonging or not belonging to the user-defined class. As an output, the word processing application may highlight a sentence when the sentence is not "business-like communication that is pleasing to a customer."

Other text labelling systems have required some predefined minimum number of manual user-input examples and, in addition, have required a great deal of computer processing to perform supervised training of a label classifier. The present technology improves the state of the art by providing good performance while, for example, making use of a model trained primarily in an unsupervised mode, without requiring a large number of manual user-input examples of a label class. Because the input and computer training requirements of the labelling service are far less resource intensive than typical, the computerized system provides a technical improvement of requiring less computer processing to render a result.

The technology described herein provides this improved efficiency by receiving the candidate text and the label, and may produce from them a semantically rich positive example of label text. Likewise, a labelling service may produce from the candidate text and the label a semantically rich negative example of label text. The labeling service makes use of a generative model to produce a generative result, which estimates the likelihood that the label properly applies to the candidate text. The success rate of the classification can be improved, while maintaining this improved efficiency, by obtaining a second generative result from a generative model and estimating label probability using the second generative result.

In another aspect, the technology is directed toward a method for obtaining a semantically rich example that is similar to a candidate text. Other solutions to this problem have provided a semantically poor representation of the input data, or alternatively have relied upon vast amounts of manual data to provide training. Either of these other solutions have required a great deal of computer processing to train the model that performs the classification. The present technology improves the state of the art by providing good performance while producing a semantically rich example, without requiring a large number of manual user-input examples of a label class. Because the input and computer training requirements of the labelling service described herein are far less resource intensive, the computerized system provides a technical improvement of requiring less computer processing to render a result. A labelling service provides this improvement, for example, by obtaining a set of keywords that reflect the richness of the candidate text in the context of the label. The set of keywords are presented to a search service 164, and a text snippet from the search results with a good relevance rank is obtained to provide the example when the label class confidence of the extracted snippet is high.

In another aspect, the technology is directed toward a method of providing a semantically rich set of keywords from candidate text in the context of a label. Other solutions have been semantically poor in representation, and so the number of returns from a search engine that must be received to obtain a certain number of relevant results was large. This large number of required returns meant high computer processing requirements. The present technology improves the state of the art, for example, by providing good performance while producing a semantically rich set of keywords, thus reducing the amount of data required for training. A set of candidate text priority keywords are obtained from candidate text. A set of label priority keywords are obtained from the label. Priority keywords are assigned embedding vectors using a transformer-based model. Context-aware keywords are determined by similarity of the priority keywords based on the embedding vectors to obtain a set of context-aware keywords. This context-aware set of keywords allows for obtaining information from the search engine, which is semantically close to the candidate text in the context of the label, and therefore the amount of search processing required to return a certain number of relevant results is reduced.

Definitions

A label is generally a category described by a single word/term or a description of a content requirement around which a model is to be trained. A label is generally a category into which another electronic entity, such as a natural language input string might be classified.

An anti-label is generally a category comprising those electronic entities that do not belong to the class described by a label. In the context of a multinomial class, the anti-label includes all those enumerated classes that do not belong to the label class.

A custom label is generally a user-defined natural language description that is input by a user as an indication of a desired label category.

A labeling service is generally an application that assigns a label or a label probability to electronic items, such as natural language strings.

A label scoring service is generally an application that scores a candidate natural language input string for measuring the distance of the candidate from a label in the context of other alternative labels that might be applied. Generally, a label score may be a measure, such as a probability, and may be used to classify the candidate into one or more categories associated with a label, such as a label, an anti-label, or a sub-category of a label or a sub-category of an anti-label.

A transform service is generally a service that takes in a term or a set of terms and transforms them according to an operation such as synonym, antonym, word form, etc.

A prioritized keyword extraction service (e.g. FIG. 9) is generally a service that takes a text string, extracts keywords and orders them, e.g. in a label structure such as a list of keywords ordered in descending importance order.

A context-aware keyword extraction service (e.g. FIG. 7) is generally a keyword extraction service that represents a candidate text in the context of a label.

Figure 10:
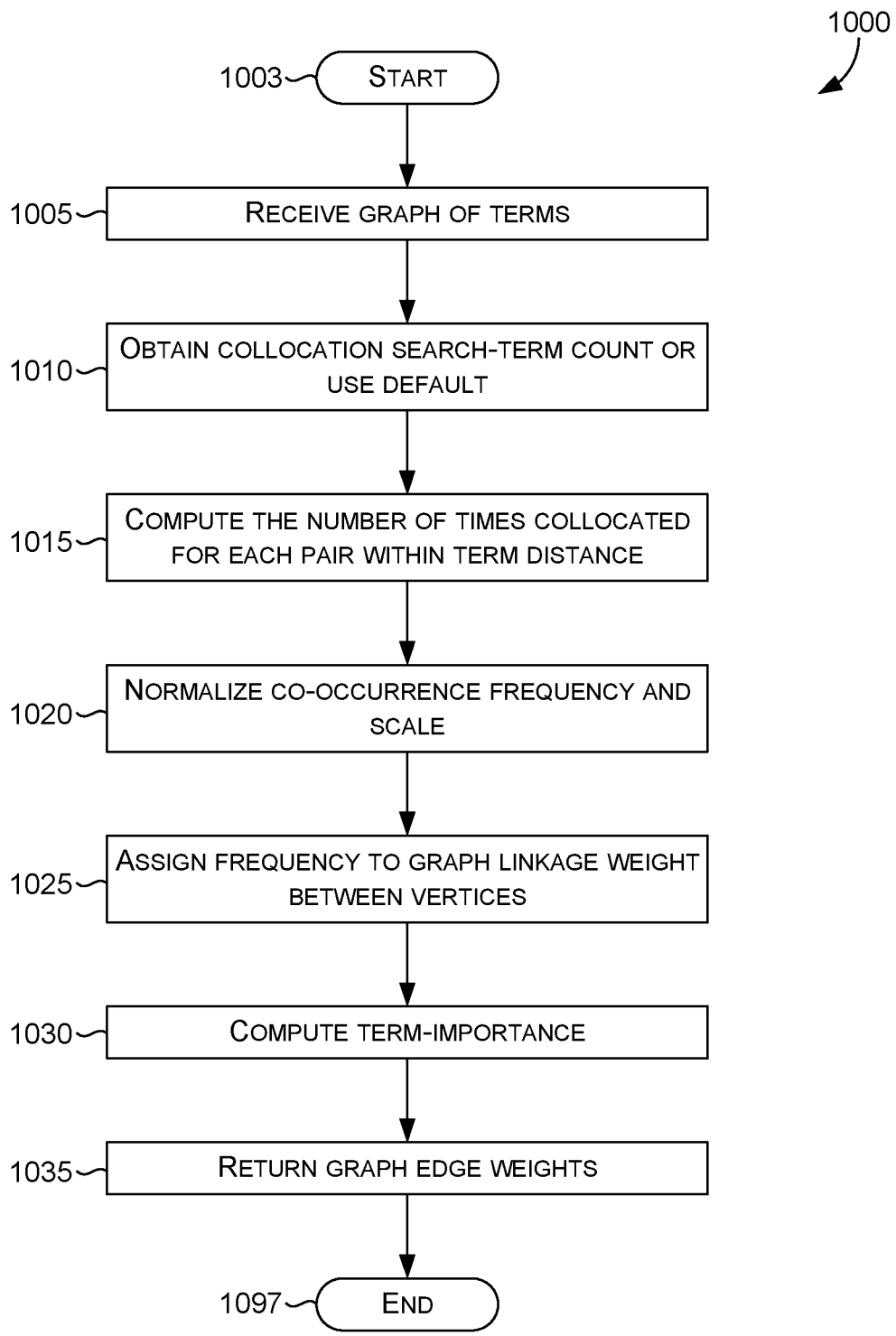
FIG. 10 is a flowchart of a method for computing similarity, in accordance with an aspect of the technology described herein.

A term similarity service (e.g. FIG. 10) is generally a service that operates on a structure of keywords, such as a graph, and represents term similarity, e.g. by weighted graph linkage between terms of a graph.

A search service 164 also known as a search and retrieval service is generally a search service that operates on a query over a corpus of documents and returns a relevance ranked list of documents from the corpus together with a text snippet that provides a portion of a document particularly relevant to the query.

A Natural Language Processing (NLP) application is generally a computerized application that operates on natural language input, such as audio input or text input, to perform a computerized operation on a natural language input string.

A Natural Language Generative (NLG) model is generally an application that generates natural language text based on a generative input. The generative input may be for example, a token, a series of tokens, or some other input mechanism like a series/vector of numbers. As such, these systems may not generally be capable of performing the function of an unsupervised label classifier. Examples of NLG models include GPT-2, GPT-3, and DeBerta.

A generative Pre-trained Transformer model is generally an autoregressive language model that uses a neural network based on deep learning.

A Transformer model is generally a deep learning model that makes use of an attention mechanism to incorporate a broad context of an input in the context of other inputs that may be relevant to a classification decision.

A transfer-learning model is a neural network model in which models learn at least partially from large unsupervised and unlabeled data. Such models may be further fine-tuned with data, preferably with data from a similar domain to an application of the model.

A zero-shot generative mode is generally a mode of a generative NLP model capable of generating text without fine-tuning with a specific type of data. A generative NLP model generally receives an input text string and produces a generative result that is text, which is generated at the prompting of the input text string.

An unsupervised label classifier generally indicates a label classifier that does not necessarily require examples of the labeling class to be provided by the user, but may make use of user-provided examples to enhance performance.

A semantic search model is generally a learning model, such as a deep learning model, that measures distance in a linguistic semantic space from a query document to another document in a set of documents and returns a measure, such as a cosine similarity, that expresses the closeness of the query document to the document in the set of documents. (Examples of semantic search models include DSSM)

Having briefly described an overview of aspects of the technology described herein, an exemplary operating environment in which aspects of the technology described herein may be implemented is described below in order to provide a general context for various aspects.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of computer devices, such as user device 105, server 125, cloud service 199, application service 175, fabric controller 179, server cluster 176, server 177, storage service 180, network 186 and network 103. Each of the components shown in FIG. 1 may be implemented via any type of computing device, such as computing device 800 described in connection to FIG. 8, for example. These components may communicate with each other via network 103 or network 186, which may include, without limitation, one or more local area networks (LANs) and/or wide area networks (WANs). In exemplary implementations, network 103 and network 186 each comprises the Internet and/or a cellular network, amongst any of a variety of possible public and/or private networks.

In an aspect, the technology is directed toward a computerized system, e.g. shown in operating environment 100 that performs a method to classify a text as either belonging to a user-defined text label or not belonging to that label. A labeling application 110 in the operating environment 100 may present a prompt to the user on a display 120. A display 120 may be a visual display or a speaker. A user input device 115, such as a microphone, mouse or keyboard, in device 105 receives an input from the user. In embodiments, the input may be a natural language string that serves as the user-defined text label. In an embodiment, the operating system 107 converts audio signal input to a text string and labeling application 110 receives the text string as an input. In an embodiment, operating system 107 receives keystrokes from a keyboard 115 and provides a text string to labeling application 110. The labeling application 110 also receives candidate text to be classified from the user in a similar fashion. Candidate text might be received by the labeling application 110 from user input or from a document in a corpus 154 of system documents. At the conclusion of the process, the labeling application 110 provides a result of classification, such as an indication presented on display 120 that the candidate text likely belongs to the user-defined label.

Computer device 105 and server 125 may be client devices on the client-side of operating environment 100, while server 125, server 177, cloud service 199, application service 175, fabric controller 179, server cluster 176, and storage service 180 may be on the server-side of operating environment 100. A computer device 105 generally includes an operating system 107 a user input device 115, such as a touch screen sensor or mouse, and a display 120. Computer device 105 also importantly includes a labeling application 110 that may be for example a browser, a plugin, a downloadable application, a search application, an information management system, a special purpose application, a labeling application, a label assisted search application, a label assisted classification program, a writing assistant, an automated compliance application, a customer relationship management application, etc. Labeling application 110 may also be a user interface component that performs one or more of these application functions in conjunction with an application shown on server 177. The applications on remote server 177 and on device 105 in an embodiment are present on server 125.

In an embodiment, labeling application 110 communicates with components on remote server 177 to cooperatively carry out the functions provided for the user by labeling application 110. For example, components that cooperate with labeling application 110 may include labeling service 142, label scoring service 168, term transform service 144, search service 164, prioritized keyword extraction service 146, Natural Language Generation (NLG) Model repository 162, contextual embedding generation models 158, context aware keyword extraction service 148, vectorization functions 156, term similarity service 152, corpus 130, corpus 195, and corpus 154. These components may be embodied as a set of compiled computer instructions or functions, program modules, computer software services, or an arrangement of processes carried out on one or more computer systems, such as computing device 800 described in connection to FIG. 8, for example.

Server 177 may comprise server-side software designed to work in conjunction with client-side software on user devices 105 to implement any combination of the features and functionalities discussed in the present disclosure. For example, the server 177 may run an information management system for device 105, which manage access to and use of information in a knowledge graph. The server 177 may receive digital assets, such as files of documents, spreadsheets, emails, social media posts, user profiles, and the like for storage, from a large number of user devices belonging to many users. This division of operating environment 100 is provided to illustrate one example of a suitable environment, and there is no requirement for each implementation that any combination of a server 177 and a user device 105 to remain as separate entities.

Computing devices, such as user device 105 and server 125, may comprise any type of computing device capable for use by a user. For example, in one aspect, user device 105 and server 125 may be the type of computing device described in relation to FIG. 8 herein. By way of example and not limitation, a computing device may be embodied as a personal computer (PC), a laptop computer, a mobile device, a smartphone, a tablet computer, a smart watch, a wearable computer, a fitness tracker, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, a file server, a web server, an application server, a host computer, an enterprise server, a cluster of servers, a data center, a search appliance, a virtual server, a daemon, a mainframe or any combination of these delineated devices, or any other suitable device.

The disclosure describes systems and methods to train text classification models without the need of representative labelled data or human grader's assistance to create representations that could otherwise be used directly or indirectly to create representative data conducive to train a Natural Language Processing (NLP) or a text classification model that could map/classify a candidate input text across one or more classes (class-labels) of interest.

Generally, an unbiased text classification model, trained on an unbiased non-representative training data (in the absence of representative labelled data) could at best claim a 50% accuracy for binary classification. This is comparable to human cognition of labelling all data as 'positive-label-class' or 'negative-label-class' in a binary label classification mode. This is used as the scientific basis (ref. ROC curve's baseline) to compare any candidate model.

The technology of the present system is not only more accurate than what is possible by above human heuristic or unbiased model classification (trained on unrepresentative data). Results of some experiments have demonstrated better accuracy, and an established 'recall and/at-defined False Positive Rate (FPR)' which gives the decision-maker more objective information about the utility of the model in a real life scenario.

Figure 2:
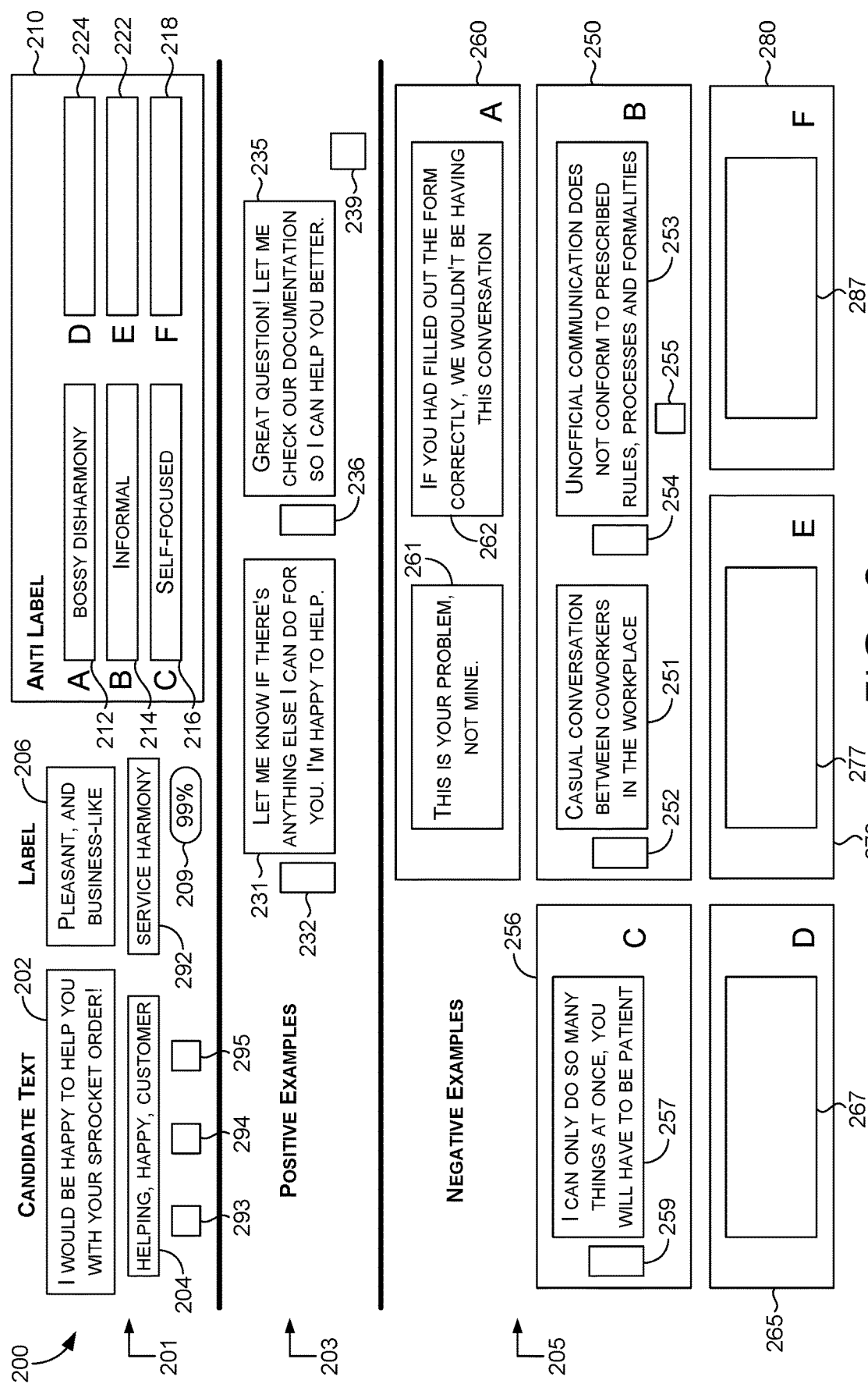
FIG. 2 is an exemplary display of a labelling application suitable for implementing aspects of the present disclosure.

Turning to FIG. 2, an exemplary graphical display 200 shows a user display of a browser application performing as labeling application 110 for an exemplary labeling service 142 that performs the functions of a Customer Relationship Management system. Corpus 154 of the CRM system houses sales, marketing, and services communications over text, web, and email. Graphical area 202 provides a control element. Initially, the user provides text to define a candidate text. The labeling application 110 receives the candidate text. When the user enters text to define the label into graphical control 206, the labeling application 110 receives the label text string. A text string defining a label could be a word, a term or a description of an arbitrary concept or idea.

The labeling application 110 sends the two strings (candidate text and label) to labeling service 142. Labeling service 142 performs label processing and renders one or more results to labeling application 110. Labeling application 110 then updates graphical display 200 to include a result, such as a result displayed in graphical display areas 209, 231, 235, 261, 262, 257, 251, 253, 212, 214, 216, 292 and 204.

Display area 204 shows a set of context aware keywords that represent candidate text, as determined by labeling service 142. Display area 212 shows an ordered list of keywords that represent an anti-label derived from the candidate label text. Display area 292 shows an ordered list of keywords that represent an anti-label of the candidate label, and that are derived from the candidate label text. Display area 214 shows a set of anti-label keywords derived from the candidate label text. Display area 216 shows a set of anti-label keywords derived from the candidate anti-label text. Display area 209 shows an estimate of the probability that the candidate text belongs to the label class defined. Additionally, display area 209 could provide a display of a result, such as true or false, based on a threshold decision of label class membership applied to the estimate of probability.

Labeling service 142 returns a candidate label-class prediction, such as 1 for true, 0 for false, to provide a binary classification output. Generally, all rendered result data is received by labelling application 110 from labeling service 142, which provides the rendered result data to be presented on display 120. Generally, a labelling result that is rendered is any label-related information item whose display or use is provided to a component of a labeling system, e.g. shown in operating environment 100 when the labeling service 142 has determined that the candidate text meets acceptably criteria. For example, acceptability criteria may be that an estimate of the probability of a label class is above an acceptable threshold level. The rendered results are capable of being provided in an unsupervised fashion, because the system does not require a user to necessarily provide any examples of text that are properly classified to a defined label.

In an embodiment, graphical display 200 is updated to place candidate text, which meets acceptability criteria into a positive example display area 231, while clearing the candidate text from graphical control 202 in order to prompt a user to input an additional candidate text. By repeating this candidate text entry, a user is able to build a library for a label of positive and negative examples with computer assistance that performs semantic language processing to produce positive examples, such as those shown in graphical display areas 231 and 235, and negative examples, such as those shown in display areas 261, 262, 257, 251 and 253. The method provides automatic classification of candidates, and augments a set of input data to include positive and negative examples, as well as keyword structures. Repeating candidate text entry can populate additional anti-label definitions in graphical display areas 224, 222 and 218 as well as additional negative example display areas 267, 277 and 287. The capital letters A, B, C, D, E, and F in graphical display 200 indicate anti-label display area 212, 214, 216, 224, 222, and 218 are sub-categories that the labeling service 142 determined to correspond to anti-label examples shown in display areas 260, 250, 256, 265, 270 and 280. In this way, a rich set of anti-label sub-categories are determined by the labeling system shown in operating environment 100 and displayed to the user in an intuitive and helpful user graphical display 200. The display pairs a set of anti-label keywords with the corresponding examples, and allows a user to provide feedback on the utility of an anti-label or of corresponding examples that are related to an anti-label. Generally, any display area that provides a result may have an associated control, such as 232. An example display area, such as display area 231, is shown with a corresponding graphical control 232 allowing a user to over-ride, or to provide confirmation that the adjacent example fits the label assigned by the system. Graphical control 232 may contain a prompt, such as "is this a good example?" with a check-box for yes, and a check-box for no. Alternatively, the display could be a radio button, that is marked green, or good, and when selected toggles through red and yellow to indicate bad and mediocre examples. Similar to graphical control 232 are graphical controls 236, 259, 252 and 254 Graphical control 239 allows all shown positive examples to be confirmed or rejected for display areas 231 and 235. Likewise, graphical control 255 allows display areas 251 and 253 to be confirmed or rejected with one control.

While the graphical display 200 provides an illustration of the technology disclosed herein, a system is operable to determine class labeling when the candidate text, e.g. text shown in graphical control 202 comes from a different user, or from a document corpus 154, such as a sentence from an email of a salesman. The user of graphical display 200 could be a CRM manager who provides only the bare definition of a label input, such as "Pleasant, and Business-like" into graphical control 206. The labeling service 142 can then begin building a library by searching through documents in corpus 154, testing sentences that have been written, and building a label example library to define the label class. Accordingly, display area 200 could provide a much cleaner display initially, providing only a graphical control 206 visible to the user. After the user enters the label into graphical control 206, some number of iterations could be performed and the graphical display 200 could display an estimate of the viability of the label offered over a corpus, and could provide alternatively a set of links to the documents or portions of documents that are closest to the description offered by the user. Additionally, a label-based document search capability could be provided by logically combining label definitions developed by a user. After each label classifier has reached sufficient performance, the label classifier could be placed in a user's library and combined to find documents that provide a high score in the combined context of the labels that the user has defined.

The graphical display 200 presents a number of display areas to allow a user to provide low-level feedback to the system to improve the classifier. The display generally includes an anti-Label display area 210, a class definition display area 201 a positive example area 203 and a negative example area 205. Generally, graphical display 200 presents any user input results in data being signaled from labeling application 110 to labeling service 142.

In an embodiment, input-text is of arbitrary length. The label could be merely a short sentence or a document. The label-required is given in terms of the label for the positive class; the negative class is treated as an absence of the positive class. This could be either a word, term or a description of an arbitrary concept or idea.

The technology described herein is broadly applicable. The present technology could empower many systems. For example, one use of this technology is for automated compliance, where the tenant admin could request the entire enterprise data corpus (including emails, chats, document repository, contracts etc.) to be labelled with respect to any concept that may be felt necessary at that time and timely responses are important, for not only legal reasons, but also business reasons. There are several other applications where such insights are required, but at a scale, speed, objective, or fairness level that could not be matched by either a single human or a collection of a team of humans for one or more reasons below.

The technology described herein scales efficiently. The technology described herein is intended for enterprise scale data (including emails, chats, document repository, contracts etc.), which is not feasible for any number of humans to process manually and objectively for a desired purpose.

The technology described has low latency and can process large amounts of text input efficiently. The technology is intended for applications that need to process large data and deliver output in reasonable time to be considered effective and useful for business and legal purposes, which is not feasible for any number of humans to process manually and fairly for the desired purpose.

The technology described herein maintains user privacy and confidentiality. Human processing of critical data is vulnerable because several risks are involved with having human analysts involved in a bulk label-classification effort. Besides legal and compliance requirement, even for non-enterprise data, it may not be advisable or even feasible to expose such data to a single or a team of users.

The technology described herein has excellent fairness. Human cognition is not singular and is often biased or limited both from knowledge of a given concept, understanding of a given context, and knowledge of a particular language. Therefore, such tasks when done by different humans, bears critical risks of bias, which could neither be ascertained, nor controlled in wide application as desired. By exposing keyword context to the user for the technology described herein, a user is able to modify a label which was poorly defined, or that used words, which did not mean precisely what the user thought that they meant.

The present technology has excellent objectivity. The objective of the system is not just the prediction of arbitrary candidate-label levels for arbitrary candidate-text, but also the associated confidence as this is required or otherwise useful in many downstream applications and associated software features that this disclosure empowers. Humans' cognition is generally biased by virtue of the limited understanding of an individual, and so cannot produce any objectively defined and auditable confidence number for the accuracy of cognition or a specific candidate-label level.

The technology disclosed herein has excellent multi-lingual capabilities. Any human is limited by their knowledge and command of different languages and command on different concepts in even the languages known. Therefore, a single human's cognition may not be sufficient, and a group of human's cognitions may be inconsistent across the different combinations of language, concepts, and expertise.

The technology disclosed herein has excellent auditability and reproducibility. In multiple domains and in applications requiring compliance, it may be critical to have not only objectivity built into the process, but to also demonstrate reproducibility and consistency. Human cognition-based system cannot be employed into these domains and applications.

The technology described herein has excellent economy and reliability. Currently, many labelling requirements operate on a few pre-defined labels, and are achieved only at great expense, and poor reliability, at a very limited scale. Typically, competing methods are conducted through paid assignments (analysts, vendors, or human contractors), or crowd sourcing. Those that involve paid assignments are expensive. Those that involve crowd sourcing are not reliable.

Figure 3:
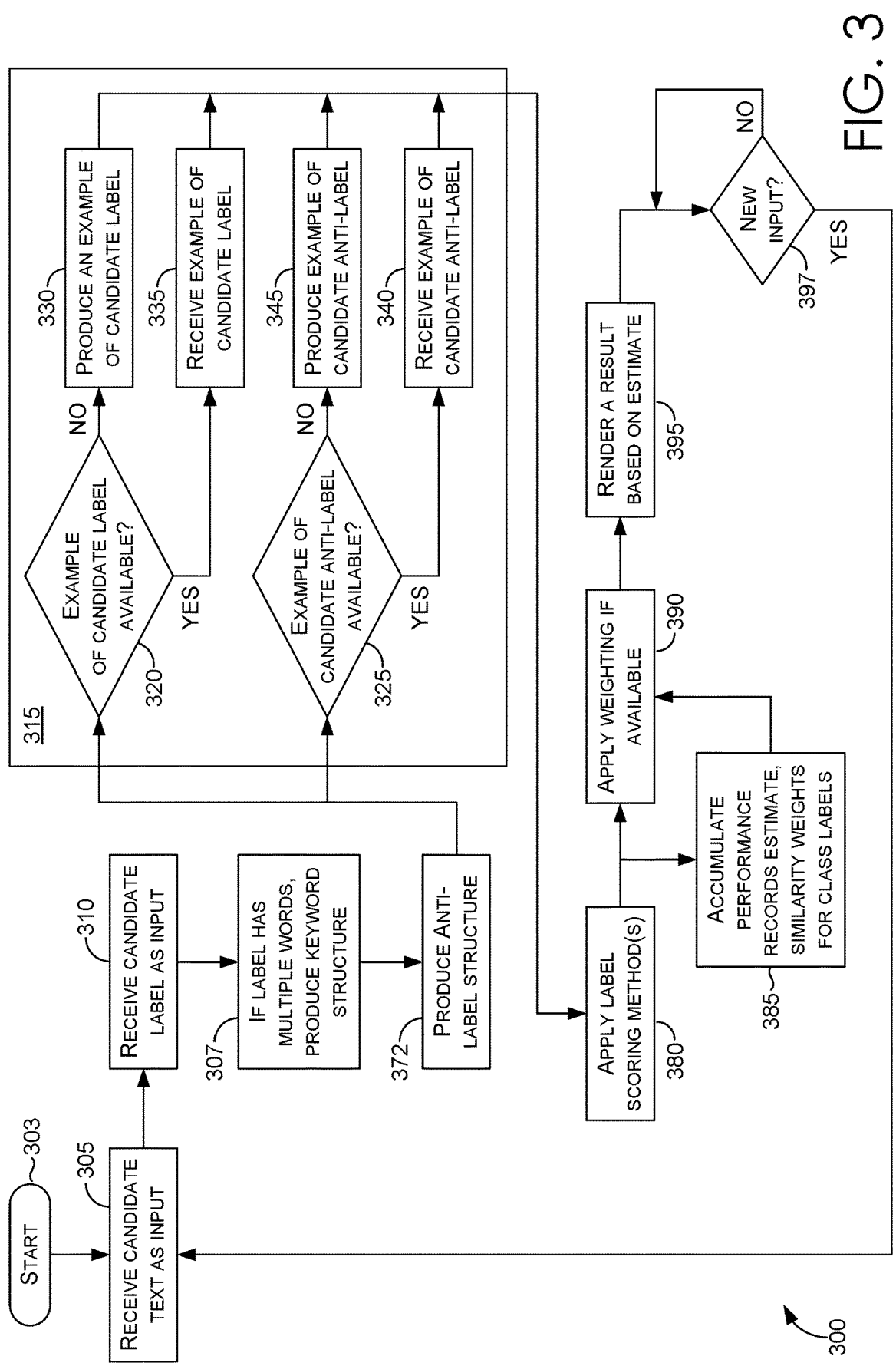
FIG. 3 shows a flowchart of a method for providing a result based on an estimate of a probability that a label would be properly assigned to candidate text, in accordance with an aspect of the technology described herein.

FIG. 3 shows the processing flow of the labeling service 142 that performs a computerized method of rendering a result, such as that shown in display area 209, which is sent to labeling application 110 when the labeling service completes without error message to provide a valid estimate. Generally, it may be advantageous to initialize the labeling service 142 on server 177. As part of labeling service initialization, an NLG model is loaded into the memory of server 177. In an embodiment, an NLG model is hosted in a cloud service 199 using multiple real or virtual servers to provide high scale service. Generative NLP models available in a repository 162 are loaded (or remains pre-loaded throughout). For better results, larger and more expressive models may be used. The models may preferably be pre-trained (concept of transfer learning where models learn partially from large unsupervised and unlabelled data) and further fine-tuned with data, preferably from similar domains as application requirements. Some examples of similar models could be (but not limited to) GPT-3, Microsoft DeBerta etc, preferably models with a good zero-shot generative capabilities mode (a mode in which the model could generate text without fine-tuning with specific type of data). The current state of the art (SOTA) in NLP generative models are large (more than 10 Billion trainable parameters) Transformer based models. The present disclosure does not restrict the disclosure to the usage of these models, and any available model that could be made compatible with one or more scoring mechanisms disclosed herein could be used.

An NLG model taken from repository 162 and employed by labeling service 142 to perform a step in a label scoring service 168 is generally trained over a natural language corpus that is unlabeled. Likewise, an NLP model whether it is stored in the group of models 158 and used to generate contextual embedding, employed to perform a transform service 144, or to perform vectorization 156 likewise is generally trained over a natural language corpus that is unlabeled. Such models are generally trained applying token masking techniques. In an embodiment, an NLP model or NLG model employed in the present service is trained over a web corpus an enterprise data corpus, or another corpus. The techniques disclosed herein are operable with a neural network model, a non-neural network model, a partially (pre-trained model), a model that is fully trained, and a tuned model, among other models.

The method of rendering a labeling result, e.g. method 300 begins at step 303 when the labeling service 142 serves a display page to labeling application 110. At step 305, labeling service 142 receives a text string defining candidate text from a document in corpus 154 or from the labeling application 110. At step 310, the labeling service 142 receives a text string defining a label, e.g. from labeling application 110. At step 307, if the label received has multiple words, a keyword structure for the label is determined by labeling service 142, e.g. as described for example in FIG. 9. When the label has multiple words, method 300 uses an additional sub-process, to reduce it to the relevant level compatible with the remaining process. In an embodiment, the keyword algorithm is an available extractive text summarization and keyword extraction algorithm. In an embodiment, for purpose of illustration, when an input is "Pleasant, and business-like", the output is an ordered candidate label ("Service", score=0.6), ("harmony" score=0.4), as shown in label graph 1130 illustrated in FIG. 11, which also shows tag display 1160.

Figure 9:
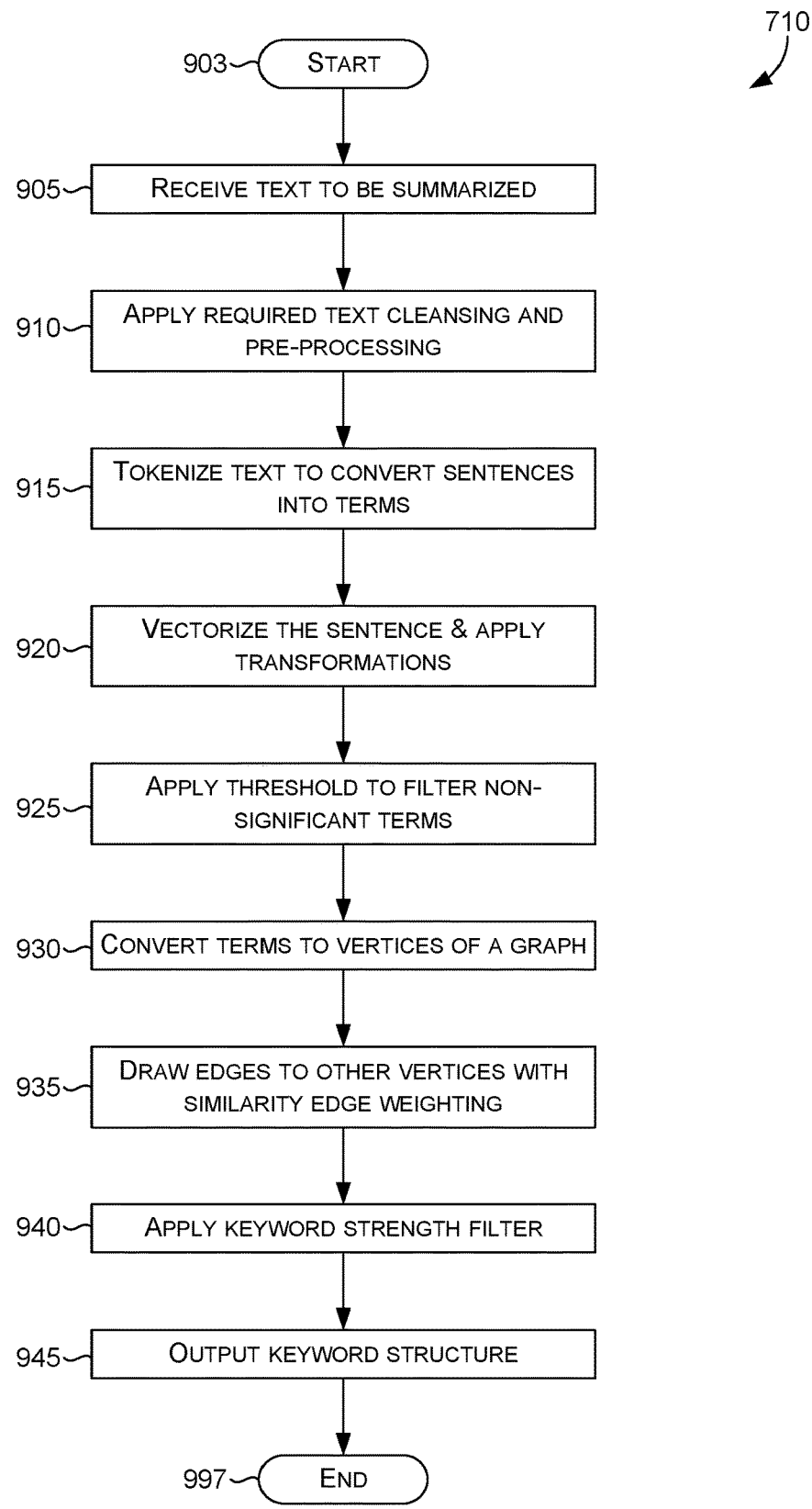
FIG. 9 is a flowchart of a method of preparing a prioritized set of keywords, in accordance with an aspect of the technology described herein.

Turning briefly to FIG. 9, there is presented in the method of performing step 710 a computerized method for prioritized keyword extraction, which begins at step 903. The method proceeds to step 905 where the text to be summarized is received by the keyword extraction service 146. In the present example the label text "Pleasant, and business-like" is received. Additionally method of performing step 710 receives a constraint that limits the size of the structure produced. For example, a size constraint might be the maximum number of top keywords for the service to retain, and can be received by method of performing step 710 from storage service 180. In another embodiment, a size constraint might be a keyword strength threshold, which is received by method of performing step 710 from storage service 180. The size constraint is then later applied at step 940 to filter out insignificant terms. At step 910, the text is cleansed and pre-processed so that extraneous characters are eliminated and the text is prepared for further processing. In an embodiment, the text is changed to all capitals to simplify additional processing. The method proceeds to step 915 where the cleansed text is tokenized into terms. In an embodiment, the original expression of the text is converted through synonyms to a more compact vocabulary. At step 920, the terms of the sentence are vectorized and transformations are applied. A vectorization function is generally a function that converts a set of terms into a meaningful numerical representation. Examples of vectorization functions include Term Frequency Inverse Document Frequency (TF-IDF), Global IDF, Entropy Weighting. At step 925, a threshold on the vector transformation metrics is used to filter out non-significant terms. The remaining terms are used at step 930 to form the vertices of a graph. At step 935 each vertex (term) in the graph is quantified for similarity to other terms in the graph by drawing an edge to each other vertex in the graph with edge weight representing the similarity between the terms.

In an embodiment, step 935 makes use of method 1000 for computing co-occurrence based Term Similarity. The similarity computation begins at step 1003, and proceeds to step 1005 where the graph of terms is received. The graph in the present context is the graph of the prioritized keywords connected in a graph. At step 1010, a collocation search-term count or TermDistance is obtained, or a default value is used. For example, with no input, a default for TermDistance is taken as the square root of the number of terms in a sentence. A collocation search-term count in an embodiment is an integer between 2 and 10 that tells how many terms to consider in a search for a collocated term. A colocation search will be made for a term between an adjacent term and $9^{th}$ adjacent term, if a count between 2 and 10 is assigned. The method proceeds to step 1015 where a number of times each term is collocated for each pair within the term distance is found. Each vertex (term) in the graph is considered for relation to another term in the graph. The number of times the two terms are co-located within the TermDistance is counted. At step 1020, the co-occurrence frequency is normalized and scaled, so that the co-occurrence frequencies add to 1. At step 1025, each normalized and scaled frequency is assigned to a graph linkage weight between two vertices. At step 1030, the term importance is computed, if required. For each vertex (term) the term-importance is determined as a function of normalized score of all out-edges from the vertex. At step 1035, the graph edge weights are returned. The method completes at 1097.

At step 940, a size constraint, e.g. a threshold is applied to filter non-significant terms. This filter eliminates the weak keywords. At step 945, the keyword structure is output. In an embodiment, an output is the resulting graph structure. The graph may be a subgraph with the prioritized vertex and respective edge weights and vertex score. In an embodiment, an output is an ordered set of keywords. The method completes at step 997.

Returning to FIG. 3, the keyword structure determined at step 307 is stored by labeling service 142 to support, among other things, production of an example of the candidate label at step 330 by method 300. The method proceeds to step 372 where an anti-label structure is produced and stored by labeling service 142. An anti-label structure is used, among other things, as a means of producing an example of a candidate anti-label at step 345. Many different methods of creation of an anti-label may be employed. For example, the anti-label "bossy disharmony" shown in display area 212 was created by inversion of individual keywords shown in display area 292. Additionally, an entire set of label keywords can be inverted through a context aware inversion service such as might be employed by term transform service 144, or by an advanced vectorization technique, such as an NLP vectorization-embedding algorithm, which supplies antonyms of words as used in context. Additionally, the set of labels and anti-labels that have been stored by labeling service 142 can be stored in a library together with an associated explicit or implicit user approval to form a separate labeling context. This approach has the possibility of indexing abstract use of label terms as a separate area of communication that can be mined to more carefully track and use the labeling efforts of a user or of a collection of users that have a similar or shared linguistic context. As an additional inversion technique, a linguistic inversion method used focused on the term business-like and found "informal" which is shown in display area 214. Further, an example embedding vector antonym location function returned a possible antonym "self-focused" shown in display area 216. Since an anti-label category is often composite, method 300 is capable of employing one or all anti-labels found to produce examples as illustrated in graphical display 200. Furthermore, a similar semantic method can be applied to the label class to multiply label candidate synonyms for similar methods using the label class, to obtain a label class that is as semantically rich as the anti-label class that is described.

The method 300 proceeds to step 315, which performs a method of augmenting input data to include an example, or in other words, obtaining examples from the candidate label. The example shown in FIG. 3 provides a balanced initial set of one positive example and one negative example, when the user provides no more than one example of either label or anti-label. At step 320, if there was a positive example of the candidate label available the method proceeds to step 335 and the labeling service 142 receives the positive example as an input to be received by one or more label scoring methods. Likewise, at step 325, if there was a negative example, or an anti-label example supplied by the user, method 300 proceeds to step 340 and labeling service 142 receives the negative example as an input to be received by the one or more scoring methods. In the event that the user had not provided a positive example, the method proceeds from step 320 to step 330 where an example of the label candidate is produced. Similarly, in the event that the user had not provided a negative example, the method proceeds from step 325 to step 345 where an example of the candidate anti-label is produced. The method performed to produce a label example at step 330 from information about a label, or to find an example of an anti-label at step 345 from information about the anti-label may follow a similar process, but with different input.

Figure 6:
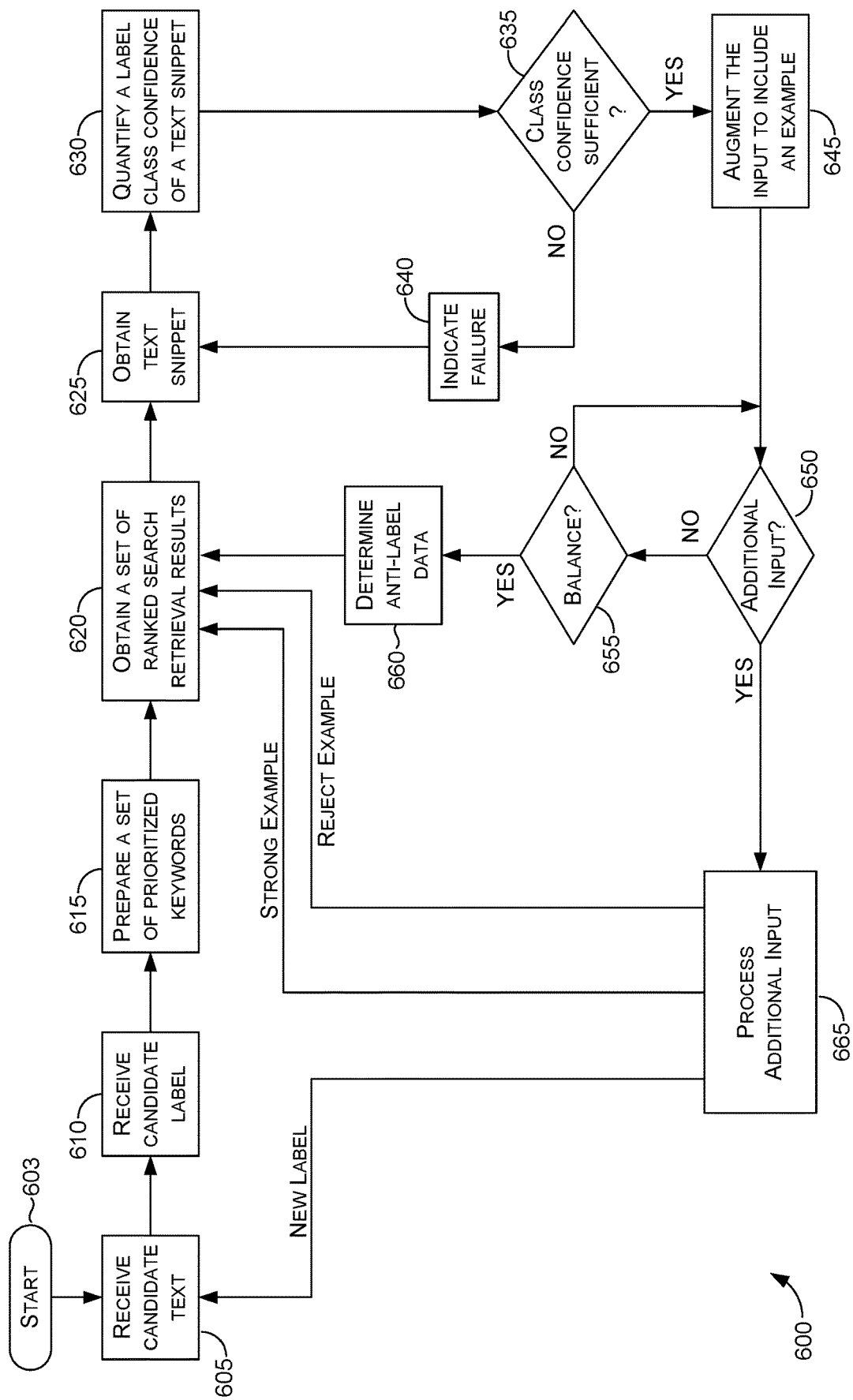
FIG. 6 is a flowchart of a method for providing a result based on augmentation of a set of class examples, in accordance with an aspect of the technology described herein.

An exemplary method of obtaining a positive example at step 330 entails performing a search over a corpus 154 using the ordered keywords derived from the label, and using at least a portion of the augmentation method 600 shown in FIG. 6. Specifically, a search over a corpus 154 is performed at step 620 using the prioritized keywords for the label as the query. At step 625, a text snippet is obtained and the method proceeds to step 630 to quantify a confidence that the text snippet belongs to the label class. An exemplary method to quantify class confidence is to construct a keyword structure for the text snippet, e.g. using method of performing step 710 of FIG. 9. An exemplary method of evaluating an overall semantic similarity between the keyword structure of the text snippet and the label keyword structure could be the use of cosine similarity based on a vectorized transformation of graph terms, or some other method provided by vectorization functions 156. Other methods are disclosed herein provide a similarity score or an estimate of probability that a label properly applies to the text snippet. If the probability is too low at decision 635, the method returns to step 625 to obtain another text snippet, which is in turn quantified at step 630, and tested at step 635. When the class confidence is sufficient at decision 635, the method proceeds to step 645 where the input is augmented to include the sufficient snippet as an example. A similar method is applied at step 345 to produce an example that aligns with the anti-label produced at step 372 to create a negative example.

Another exemplary method of step 340 of producing an example of a candidate anti-label involves performing a search over the corpus of documents using search service 164, using the ordered list of prioritized keywords from the label, and using a text snippet of an entry of low rank. For a keyword based index, this procedure is likely to return a result which is prevalent in the corpus, but which is only included because that entry aligned with a common use of a word in the corpus that has nothing to do with the context of other words in the label. The text snippet is obtained from a low-ranked return (the Kth return, where K is likely to find a prevalent corpus word used in a different context), where is e.g. K=100. Similarly, a query of the anti-label priority keywords over a corpus would return a prevalent keyword that does not quantify the anti-label class. The distance of such a distant return may also provide important information about the seperability of label from anti-label classes.

Another exemplary method of producing an example involves the computation of an additional, or balancing, example when one example has been provided by the user. For example, suppose that the example shown in display area 231 of FIG. 2 had been typed into graphical control represented in display area 231 by the user. In this case, the method at step 315 would proceed to step 335 to receive the positive example. At step 325, the method would proceed to step 345 because there is no candidate anti-label example available. In this case, the labeling service 142 at step 345 performs at least a portion of method 600, beginning at step 603 where the augmentation method 600 begins. The method proceeds to step 605 where the candidate text is received by method 600. The method proceeds to step 610 in which the method receives the anti-label keyword structure as a representation of the candidate anti-label. At step 615, a set of prioritized keywords is prepared for the candidate text. In the present example, this would occur by first obtaining priority keywords for the positive example by performing the method of performing step 710 shown of FIG. 9 to summarize the positive sample text with a prioritized graph. The graph is then inverted, e.g. as the graph of the label was inverted at step 372. The method then proceeds to perform the method of performing step 615 of FIG. 7, beginning at step 720 to produce a set of context aware keyword of the inverted graph in the context of the anti-label. At step 720, embedding vectors are obtained for priority terms of the negative text keywords, e.g. from contextual embedding generation models 158, and only the high priority terms are retained. At step 725, the embedding vectors for the priority terms of the anti-label keywords are obtained. For example, each term of the inverted text is provided an embedding vector and the list is filtered to retain only priority terms. At step 730, the similarity between priority anti-label terms and the priority inverted keywords are obtained. This might be obtained by computing similarity, e.g. cosine similarity between the embedding vectors of each priority term in the anti-label and each priority term in the inverted text. At step 735, the contextual importance is computed for priority text terms. In an embodiment, the contextual importance of each summary keyword term is computed as the normalized weighted average of similarity between each term in the anti-label, where the weights are the anti-label term's importance score. At step 740, the method determines the context-aware priority from contextual importance and keyword priority. For example, the context-aware priority of each summary keyword can be computed as the normalized product of contextual-importance and keyword-priority. The basic method of performing step 615 is the same for different inputs, such as positive text and positive label, except it ordinarily begins at step 703. A method of performing step 615 may also include a test at decision 705 if the input label has multiple terms, and when true the method proceeds in that case to step 710, and performs operations as shown elsewhere before returning to step 715 where the candidate text structure is determined that provides prioritized text keywords. The method of performing step 615 concludes at step 797, and the method returns in the present instance to method 600 of FIG. 6 at step 620. The method then proceeds as shown elsewhere to obtain a set of ranked search retrieval results at step 620, then to obtain a text snippet from an entry at step 625 and then quantifies the label class confidence of a text snippet at step 630. In this case, however, the method can make use one of the label scoring methods that perform step 380 based on an anti-label and the text of the positive example. Method 600 continues to step 635 and when class confidence is sufficient, the method proceeds to step 645 where, in this case, method 600 completes, and returns to method 300 at step 380 as shown in FIG. 3.

Figure 4:
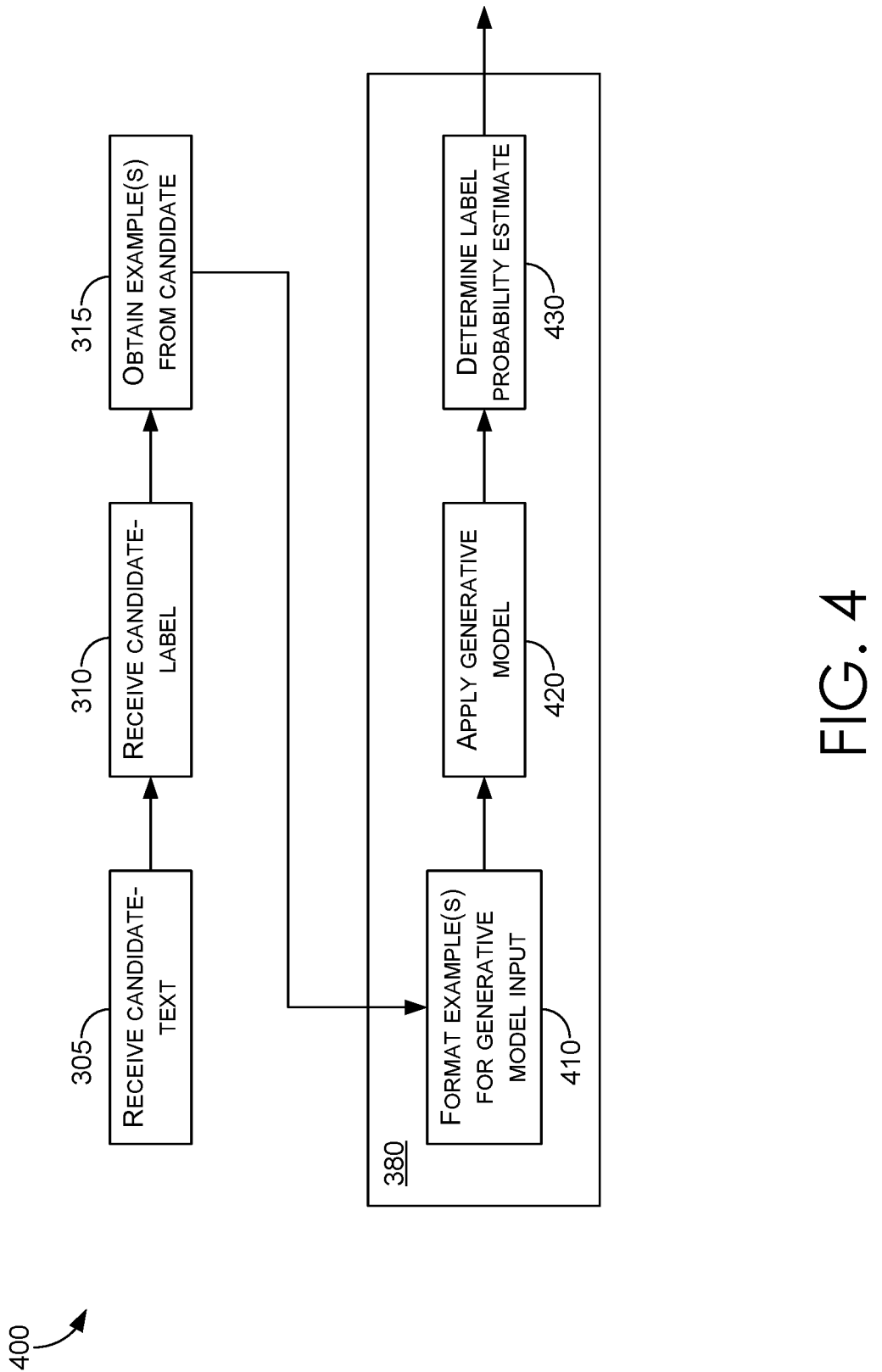
FIG. 4 is a flowchart of a method for providing a result for a candidate input based on candidate text, in accordance with an aspect of the technology described herein.
Figure 5:
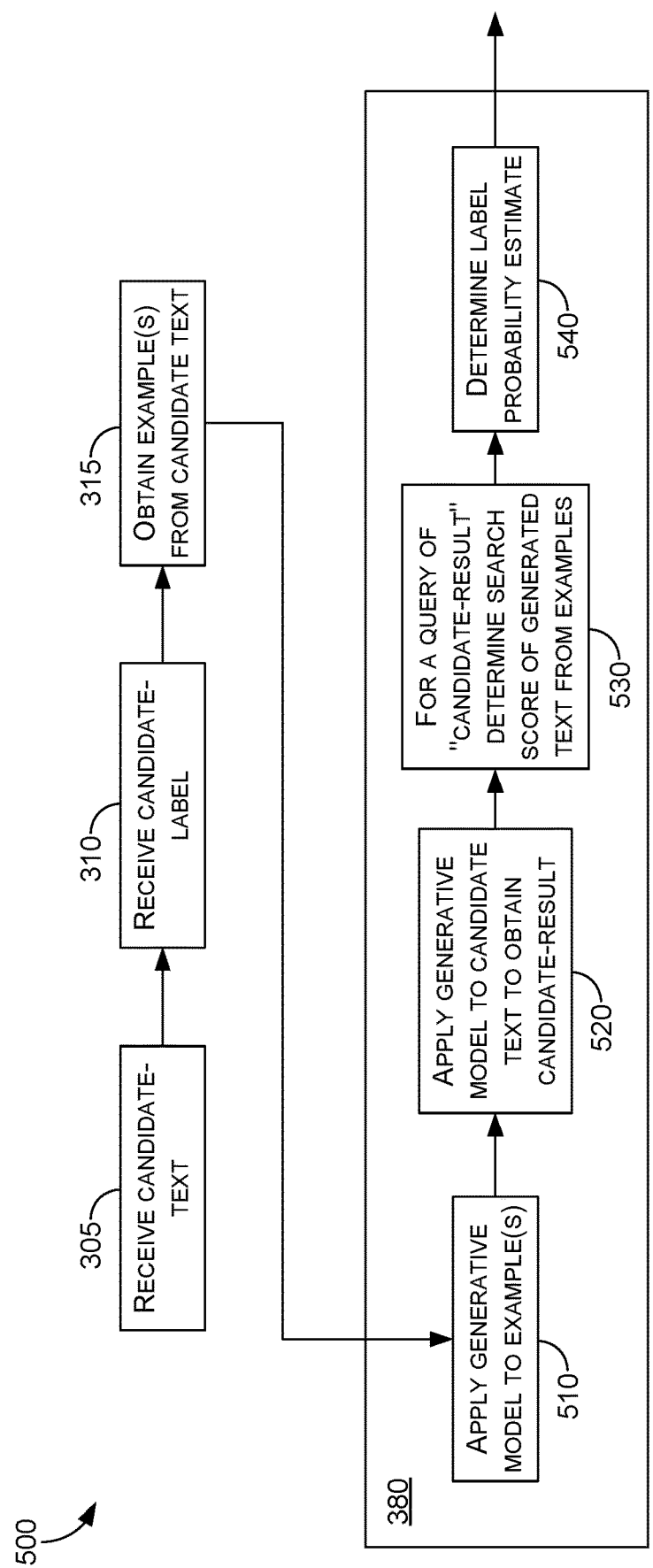
FIG. 5 is a flowchart of an additional embodiment of a method for providing a result for a candidate input based on candidate text, in accordance with an aspect of the technology described herein.
Figure 12:
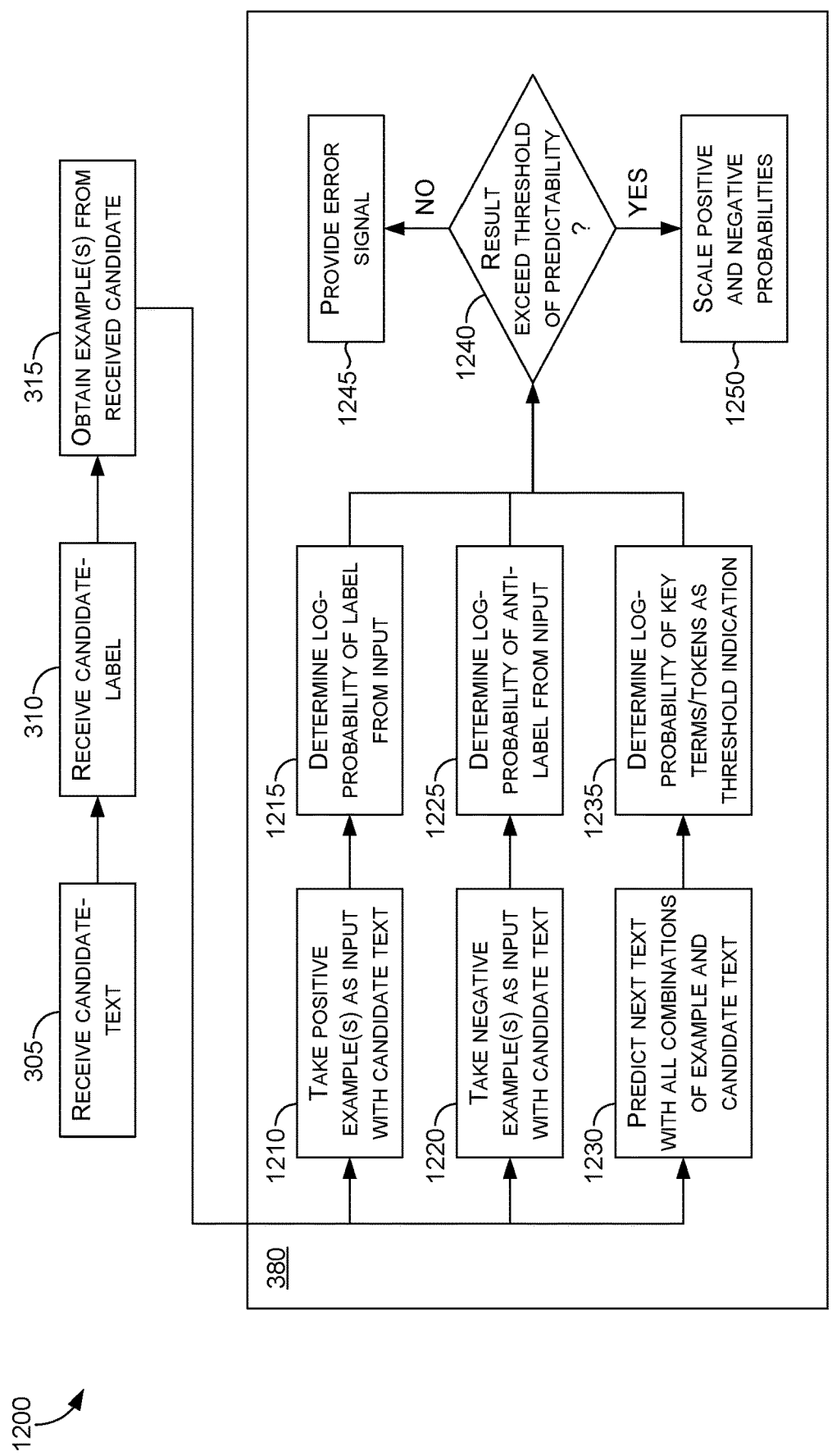
FIG. 12 is a flowchart of an additional embodiment of a method for providing a result for a candidate input based on candidate text, in accordance with an aspect of the technology described herein.

Method that performs step 380 employs one or more scoring methods as presented in method 400 of FIG. 4, method 500 of FIG. 5, or method 1200 of FIG. 12. A scoring method generally receives some number of positive or negative examples, labels, and anti-labels and scores a candidate text for the probability that a label is present using an NLG model. The present method could also, on the basis of the examples produced, make use of GPT-3 for classification with inputs provided, and return also estimate the accuracy of GPT-3 probability based on the similarity of the label to prior experience of the accuracy of GPT-3.

Figure 13:
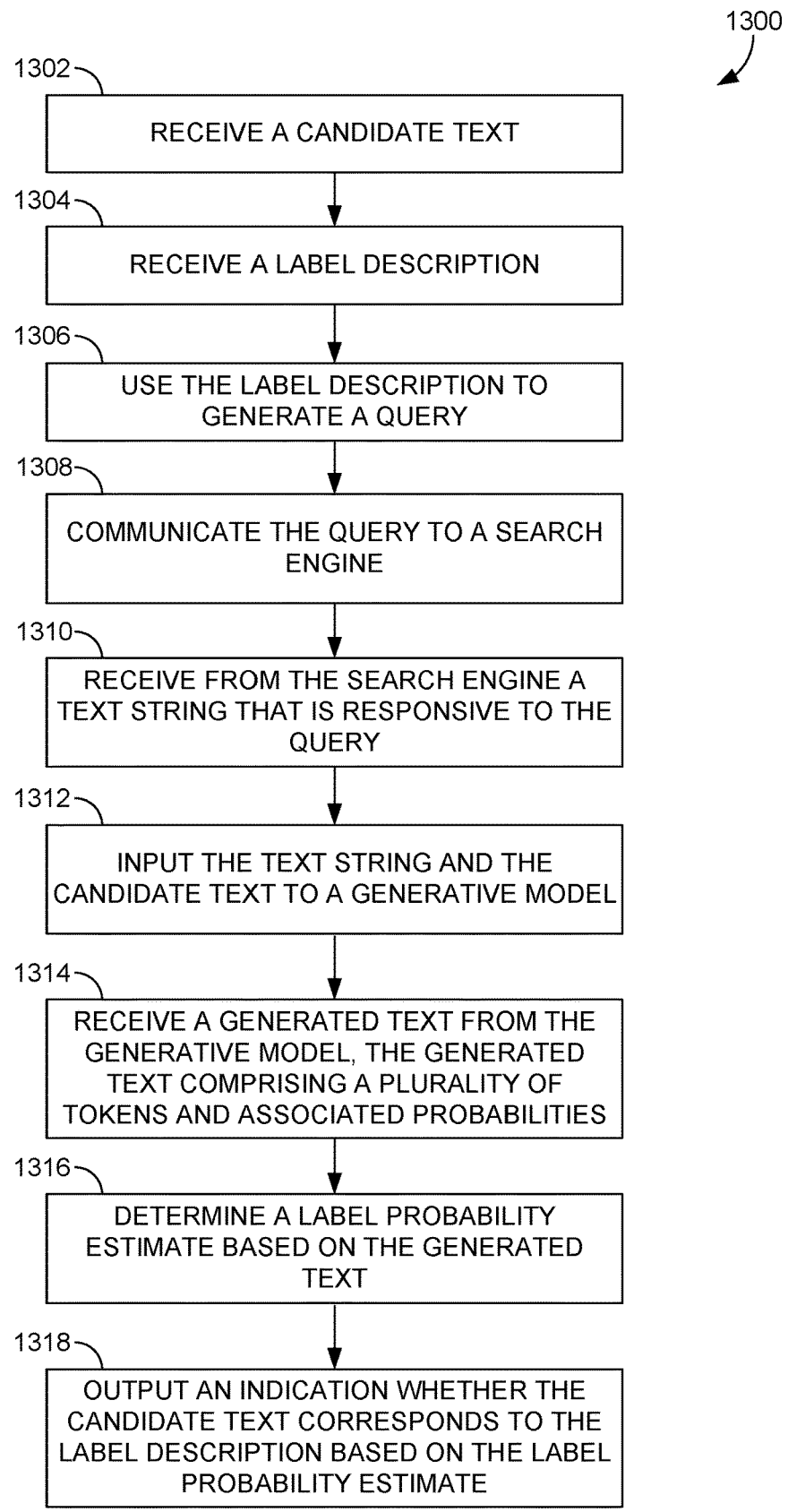
FIG. 13 is a flowchart showing a method for determining a correspondence between a class label and a text, in accordance with an aspect of the technology described herein.

The present disclosure suggests at least four different methods of performing step 380 of label scoring. A first method, shown as method 400 of FIG. 4 is known as the Numeric Class (NC) method. A second method 1300 of FIG. 13 is known as the String Label (SL) method. A third method 500 of FIG. 5 is known as the Search-Score (SS) method. The fourth method 1200 of FIG. 12 is known as the Log Probability (LP) method. In addition, a method of label scoring may be parameterized based on a risk parameter that controls how risky the generation of text by the NLG model is. A single label scoring method of performing step 380 can, for example, be operated with high-risk generation, medium risk generation, or low risk generation by the control of the risk parameter. Thus, defined methods can be multiplied and operated in parallel. Four methods that can be parameterized can be expanded to 12. For this reason step 380 of FIG. 3 specifies the application of label scoring method(s). A plurality label scoring methods may be operated for the same input, and a vector of results may be obtained that provide two or more results of label scoring methods. Thus the label scoring service 168 is in general a vector of results for a plurality of label scoring methods as described herein. Each of the NC, SL, SS, and LP label scoring methods provide an output probability of label, an indication of class determined, an indication that a result is indeterminate, an explanation of the reason that the result was indeterminate (e.g. generative method failure, augmentation failure, augmentation too weak, label scoring method failure, lack of class separation, or threshold not valid).

A setup parameter determines how many of the available models stored in label scoring service 168 will be employed for label scoring at step 380 by selecting those methods desired from label scoring service 168. In an embodiment, the setup parameter is determined based on the characteristics of the label and/or anti-label. In a model selection step, different label prediction modes are chosen. In an embodiment a single mode is the default or standard mode used by classification systems that work with data (training/validation set of labelled data), such as NC method or mode. But the method performs other scoring systems as well, each with advantages for different conditions.

At step 380 of FIG. 3, the results for selected modes are produced. For example, when all loaded modes NC, SL, SS, and LP methods are exercised, a composite output might include the vector output: [NC: (service harmony:0, confidence:0.55), SL: (service harmony:1,confidence:08), SS: (service harmony:1, confidence:0.9), LP: (service harmony: 0, confidence:0.6)]

At step 385, the scoring label service 142 accumulates performance, records estimates, similarity weights, and class labels into a library of known performance. The label scoring service 168 makes use of a repository of vector and similarity algorithms and determines if the label for a present score is similar to labeling methods available in the library. The label scoring service also makes use of a repository of NLP vectorization and embedding algorithms available in vectorization functions.

At step 390, weights are applied if available. The method may have more than one scoring methods available for a given model/algorithm. Also, in such a case, the prediction from different mechanisms may vary, or at least the associated probability could. In such a case, the method needs to reconcile the prediction and associated probability. As a default, if there exists no sub-system, then at step 390 there are no weights available. The method uses default weights or voting criteria to determine a result and a label probability estimate. When additional information is available, the method incorporates weighting into output estimation. An example of applying a weighted result includes the case in which a prior label is found in the library of classifiers, which indicates that the SS and SL searches to be twice as likely to yield correct results as the other available classifiers, the weighted response would be (2*SS+2*SL+LP+NC)/6=weighted likelihood of service harmony, is 70%. The unweighted result is 63% for the same example.

At step 395, one or more results are rendered based on an estimate when performance conditions indicate that useable results were obtained by the label scoring service. The method then proceeds to step 395 where results are rendered based on the probability estimate. At this point the labeling service 142 returns all the results displayed in graphical display 200 of FIG. 2 when useable results are available, and the method proceeds to step 397 where new input is awaited. When new input is available, e.g. additional input from user in display.

The NC method of label scoring is illustrated in 400 of FIG. 4. The method proceeds from step 315 to step 410 where the examples are formatted for generative model input. This label prediction and scoring systems behaves like any standard binary/multinominal classification system in the terms of its output. The output of the system is a Boolean/Multinominal class indicator (for Boolean positive class is indicated as 1 and negative as 0), and associated probability/likelihood. For this system the system probes the generative model in zero-shot mode with some arbitrary positive and negative sentence with Boolean/multinominal indexed classes and then the input-sentence for which the model is expected to generate a similar Boolean/Multinominal class label along with its associated 'token probability'. The associated token probability is normalized/scaled with historical model specific range parameters to be used as prediction probability/likelihood. Additional checks are made to ensure that the generated text contains the required class label, before matching the token-probability with the label and generating the output. In case these checks fail, then a 'NONE' output is sent indicating that this scoring mechanism has been opted out of the final prediction-weighting mechanism at step 390 of method 300. The NC method of label scoring at step 380 uses a number to represent the label class and another number to represent the anti-label class. So for the binary case label=1, anti-label=0. In an exemplary embodiment, an NLG model is used in zero-shot mode. For example, the model prompt might be prepared by combining the examples with respective labels using a sentence-class-separator. Separate examples using a sentence mask break. Next, the prompt is continued with another sentence-mask, followed by 'sentence-class-separator', followed by 'Prediction-Start' prompt. For a case with one positive and one negative generated example, the prompt may be: ['Positive Example' 'sentence-class-separator' 1 'sentence-break' 'Negative Example' 'sentence-class-separator' 0 'sentence-break' 'candidate text']

At step 420, the prompt is applied to a generative model, such as GPT-3. The generated text and the 'Log Probabilities' of the tokens are received for each token in the generated text. At step 430 the generative output is searched for the numbers '1' and '0'. If none of these number labels is present, the method fails and an error response is returned to labeling service 142. If a number is present, then the token probability is determined at step 430 from the generative output. For example, for the binary case the generative output is searched for the numerical labels 1 or 0. The token probability of the symbols 1 or 0 that is found is then used to determine an estimate of the label probability. The token probabilities are combined if necessary and normalized to be used as a prediction probability. In addition, the scoring method may apply its own threshold and determines if the candidate text belongs to the label. Results of NC label scoring service are stored, e.g. when returned to the labeling service 142.

Figure 16:
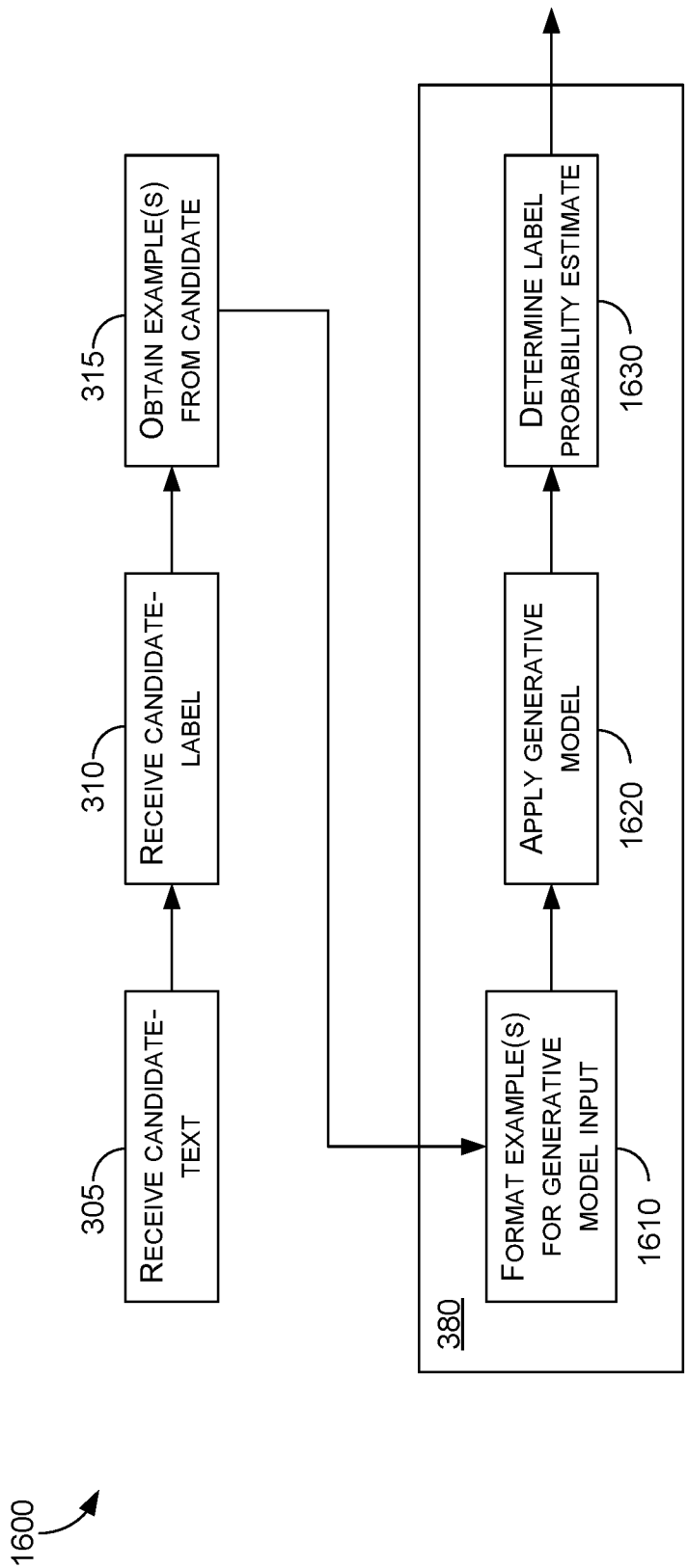
FIG. 16 is a flowchart of a method for providing a result for a candidate input based on candidate text, in accordance with an aspect of the technology described herein.

The SL method of label scoring is illustrated in 1600 of FIG. 16. The method proceeds from step 315 to step 1610 where the examples are formatted for generative model input. The SL method generally performs the operations of the NC method. But, there is a difference in the way that the prompting happens. The basic difference is that a text label is used rather than a numeric label. Arbitrary concepts that are represented by multiple words are difficult for an NLP system to understand. For this reason, the method generates order for the important keyword-based-concepts for label creation. Given that these labels are used for prompting the model, any arbitrary concept could not be directly used. The output similarly contains the prompted concept, which is later mapped back to the original 'arbitrary concept' or terms for presenting to the user. The prediction probability is generated/computed at step 1630 by finding keywords or synonyms of keywords in the generative output, and determining from the token probabilities of the keywords or synonyms in the output. For the SL mode, instead of using the numerical label, the prompt is used by combining respective labels. For example, if the label class has prioritized keyword list 'service harmony' and the anti-label class has prioritized keyword list 'disservice disharmony', and the method processes one positive and one negative example, then the prompt might be: ['Let me know if there's anything else I can do for you. I'm happy to help' 'sentence-class-separator' 'service harmony' 'sentence-break' 'This is your problem, not mine' 'sentence-class-separator' 'disservice disharmony' 'sentence-break' 'candidate text']

At step 1620, the prompt is applied to a generative model, such as GPT-3. The generated text and the 'Log Probabilities' of the tokens are received for each token in the generated text. At step 1630 the generative output is searched for keywords of the label and anti-label, e.g. "service", "harmony", "disservice," "disharmony," or synonyms of one these. If none of these keywords or their synonyms are present, the method fails and an error response is returned to labeling service 142. If one of the keywords or synonyms is present, then the token probability is determined at step 1630 from the generative output. For example, for the case the generative output is searched for the labels "service" and "harmony". The token probability of "service" and "harmony" that are found are then used to determine an estimate of the label probability. The token probabilities are combined if necessary and normalized for use as a prediction probability. In addition, the scoring method may apply its own threshold and determines if the candidate text belongs to the label. Results of string label scoring service are stored, e.g. when returned to the labeling service 142. At step 1630, the SL method of label scoring service 168 searches output generated text for terms from the candidate label or the anti-label or terms with very similar meaning/embedding in the generated context. Otherwise, the SL method performs operations as the NC method does.

The SS method of label scoring is illustrated in method 500 of FIG. 5. The SS label scoring method proceeds from step 315 to the embodiment of SS label scoring method at step 380 shown in FIG. 5. This method may use one or more samples of similar text and dissimilar/preferably-anti-text chosen as similar to the concepts in the input-label. The system sends samples along with the input-text to the specialized search ranking sub-systems/models, which provides a search rank of the different sentences/texts. Based upon the retrieved search sample and search ranking the method determines the label and probability of the label for the input-text. The search score needs additional processing to be converted to prediction probability. For most of the search sub-systems the scaled/normalized search rank/score range could be used as a proxy of the likelihood. One special consideration is that the additional sub-systems for similar/dissimilar text generation are mechanism that deals with concepts and search queries and hence are not akin to a traditional classification system, and the data generated/retrieved from these systems in its native unprocessed/unfiltered form cannot be directly used for training a classifier.

At step 510, each example in the pool of examples for the label and each example in the pool of examples for the anti-label are used to generate text using an NLG model, and tagging the output result with the associated label. So consider the case where there are two examples of label (denoted EX-L1 and EX-L2). Further, there are two examples of anti-label (denoted EX-AL1 and EX-AL2). The result from an example input is then denoted by pre-pending the example name with the indicator "GR-". Thus at step 510 applying the generative model to EX-L1 produces GR-EX-L1. Applying the generative model to EX-L2 produces GR-EX-L2. Applying the generative model to EX-AL1 produces GR-EX-AL1. Applying the generative model to EX-AL2 produces GR-EX-AL2.

At step 520, the generative model is applied to candidate text (denoted CT) to obtain a corresponding generative output (denoted GR-CT). The method proceeds to step 530 to compute a search score of candidate-generated text (GR-CT) from the document set created by the generative examples created at step 510. Generally, the idea of the SS method is to use the generative output for the candidate (GR-CT) as a query in a search engine and to measure the search resulting rank as a metric to decide if the results generated from the label examples (GR-EX-L1 and GR-EX-L2) are closer to the query (GR-CT) than the results generated from the anti-label examples (GR-EX-AL1 and GR-EX-AL2). Generally, a trained structural/semantic similarity model search engine is preferable, which measures semantic distance of between query and result, (e.g. Microsoft® DSSM). Alternatively, a GPT-3 search rank could be used.

An embodiment uses a reconciliation rule on the search rank or score of differently labelled documents over the document set, and to determine label probability estimate at step 540. A first reconciliation rule is to use the label and search rank/score of the document with the best search rank (highest search score). A second reconciliation rule is to determine a group heuristic (such as an average) of the search score heuristic of the group of all documents generated from the label examples and compare this to the search score heuristic of the other group of all documents generated from the anti-label examples. A third reconciliation rule is to shortlist the candidate documents based on search score or rank and then perform the second rule on the shorter list. For example, assume the rank highest to lowest is (GR-EX-L1, GR-EX-AL2, GR-EX-AL1, GR-EX-L2). The label class would be chosen under rule 1. Now assume that the search score of the search engine is cosine similarity between the documents in a semantic space yielding associated scores (GR-EX-L1=0.5, GR-EX-AL2=0.3, GR-EX-AL1=0.21, GR-EX-L2=0.05). Under the second rule, label would also be chosen. With the same search scores however, reconciliation rule 3 would choose anti-label if a search score threshold of 0.08 is used. The probability estimate of label is then formed by normalizing search score. Method 500 then returns to FIG. 3 at the output of step 380.

This label prediction and scoring method requires models that have the NLP search and ranking capability. These could be pure NLP Generative models or other SOTA search ranking models. Additionally, this system requires a text generation or retrieval sub-system that could generate/retrieve text based on special requirements with no prior (provided by user or specific to a use case) training data. In one embodiment, this could a rule-based web-search retrieval system. For specific search criteria/concept (which are often repeated), these requirements could be elevated and replaced with human curated candidate-search-rank texts.

The LP method of label scoring is illustrated in method 1200 of FIG. 12. The LP label scoring method proceeds from step 315 to the embodiment of LP label scoring method of step 380 shown in FIG. 12. The LP method is also known as the dual-pass generative Log Probability based label-scoring method of performing step 380. In this system, either the mechanism of NC class indexes or SL label scoring in an embodiment is used as supporting sub-process. In the LP method, instead of asking the system to generate a label, the method replicates the input-text for each possible class index or (string) class label and asks the system to generate next text. The generated text may not be used directly, but the token-log-probability of the submitted class index/labels for different indices/labels are used, and the method choses the one with highest log-probability, after applying a soft-max function to rescale these log-probabilities to 1.

After entering label-scoring method of performing step 380 shown in method 1200, three paths operate in parallel. At step 1210, the method 1200 takes the positive examples as input with candidate text, e.g. by using a sentence conjunction technique that combines text example with label type. At step 1215, the log-probability of the label is determined from the input. At step 1220, the method 1200 takes the negative examples as input with candidate text, e.g. by using a sentence conjunction technique that combines text example with anti-label type. The method proceeds to step 1225 where the log-probability of the anti-label is determined from the input. Similarly, at step 1230 next text is predicted with all combinations of example and candidate text, e.g. by using a sentence conjunction technique to combine text example with label type. The method proceeds to step 1235 where the log-probability of key terms/tokens are derived, and used as a threshold indication. The method proceeds to step 1240 where a test is performed to see if the thresholds obtained ensure that the separation between the log-probability of the candidate text in conjunction with the label is separated sufficiently from the log-probability of the candidate text in conjunction with the anti-label. If the threshold is not valid the method proceeds to step 1245 where an error signal is generated. Otherwise, the method proceeds to step 1250 where the positive and negative probabilities are scaled to generate a prediction probability, and a prediction in favor of the class with the higher score is generated.

The disclosure describes systems and methods for data-augmentation for advanced NLP models. Here 'advanced' NLP models generally refers to the class of NLP models that have learned to focus more on context of the sentence and are complex enough to learn many rich representations from plenty of data. Some examples of such models are transfer learning-based models made on transformer architecture, e.g. BERT, TURING, GPT3 etc.

Traditional data-augmentation techniques, which are based on creating perturbations from existing training data using one or more approaches, have been insufficient. Examples of failed attempts include: Back Translation, which is translating text from one language to another (maybe a few more), and then back to the original language. Such a transformation will create another representation of the same text, presumably with slightly different choice of words, but conveying the same meaning. Another attempt insufficient on its own is Easy Data Augmentation (EDA). These are a set of easy techniques applied in combinations to change specific words/terms in the text using methods like synonym replacement, random insertion/deletion/swap. These also retain the same idea of the sentence, and just modify some words. Again, it is insufficient merely to perform NLP Sequence/Tone Alteration. In this method, the order/sequence of words in the sentence is altered. This can be random or with some simple logic (first person to third person) but does not change the idea. It has also been insufficient to use mere embedding based word/term alteration: These techniques use word embeddings from NLP vectorization models like GloVe, Word2Vec, etc. and then choose a vectorially close/similar representation of some words, (or reverse vector for antonym) to change some words in the sentence.

Traditional Data Augmentation Techniques are not conducive to modern Advanced NLP models. These traditional techniques are not suitable to augment training data for such advanced models, for the following reasons. First The models in context (e.g. BERT, Turing etc.) are based on transformer-learning, and from their pre-learning stage already know the different formulations of the same words, and hence when certain words are altered with their synonyms or similar embedding terms, it creates minimal new idea for these models to learn something new. Second, these large/advanced NLP models are mostly immune to random insertion and deletion-based perturbations, as most of them during pre-training learn to predict masked terms. Third, most of these models are multi-lingual and work on vector representations of multiple languages in a homogenous vector space; hence, they are immune to translations-based ideas. Fourth, these large models are context-aware, and hence non-context-aware transformations of words (for example changing the 'lay' where the context as in 'lay-egg' with a synonym of lay 'lye') can even deteriorate the performance of these models. Fifth, these models have billions of trainable parameters and hence require a rich corpus of training data. Here 'rich' is qualified by both volume, and significant variety in idea within the same label-class ('context'). The above insufficient techniques alone could not create a large volume of training data, and also fail miserably in creating data with different ideas (within the same label-class). Sixth, there is the problem of the bias of similar ideas. These large models learn from representation of the idea in a sentence, if the same idea is repeated multiple times (using traditional augmentation techniques), the model is likely to overfit to that idea, and perform well on text with a different idea within the same context. Seventh, a large volume of training data is needed for effective learning. Where traditional NLP models required a few thousand of training samples for saturating their learning appetite, the advanced NLP models require millions of labelled data across a given context to learn different styles of representation of different ideas underlying the context. Therefore, manual searching and grading of data may be very costly for them.

Other, alternate Data Scarce Approaches to alleviate Data Augmentation Requirements for Advanced NLP Models are insufficient as well. It is challenging to get large 'augmented' data for training models that require richer 'context' and 'ideas' in sentences to effectively train rich and advanced large NLP models. Hence, the current approaches used to alleviate data augmentation challenges for these models are as below.

First, Non-Scalable and Costly Approaches have been insufficient. These include, first: Manual Data Source Scavenging and Grading. This is the most prevalent approach for acquiring (not exactly augmenting) training advanced models. In this first insufficient method based on a context requirement (label class specifications), some diverse sources of data are acquired, then each sample of these are graded manually or via crowdsourcing. Second, scalable but less effective approaches are also insufficient, as for example Few-Shot Classification. In this approach, the NLP model (mostly transformer based), is pre-trained on large corpus of 'Web' or 'Enterprise' data without labels. This provides the befit of learning on actual human created data, which has 'richer' context and 'ideas' that synthetic traditional augmentation techniques as stated above. But such data is not labelled. However, it is found that even with a few samples of labelled data, such models perform much superior to the traditional models trained on same training data combined with augmentations created from the same training data. Another scalable but insufficient technique is mere Zero-Shot Learning. In this approach very large (billions of parameters, e.g., GPT-3) NLP models are trained to generate text (as opposed to classify text) on ever larger unlabelled training data. It is assumed that when the available few training samples are used as prompt to generate text, the models could serve as a pseudo-NLP-classification model, and hence alleviate the need of training with large, labelled training data.

Returning to FIG. 2, graphical display 200 also includes graphical controls 293, 294 and 295. These controls can be used, for example, to assist a user in performing a set of operations over data items used or produced by labeling service 142. Such controls may be used for electronic items such as a labeling standard, a document corpus, a standard change log, a labelling performance log, a labeling index and a labeling indexer. Electronic items are generally stored, retrieved, modified, and displayed by labeling service 142 using storage 180, or memory of server 177. A "labeling standard" as used herein generally refers to a collection of data items that together enable a labeling service 142 to provide a decision based on a model that judges whether or not a label properly belongs to a new candidate. A "document corpus" is generally a set of documents from which new candidates are drawn to make decisions that affect a labeling standard. A "standard change log" is generally a record of data item additions and deletions with respect to a labeling standard. A "labeling performance log" is generally a record of events related to the labeling standard that might indicate dissatisfaction, such as the frequency of rejections, the average confidence rate of examples that are manually added, the average confidence rate of recently added candidates, the average confidence rate of candidates rejected, the standard deviation of one of these statistics, or the success rate of the labeling standard against a set of control documents whose labels have been supervised and confirmed. When examples are manually added, the labeling service 142 may run the labeling standard on the entry before adding it, to get an estimate of accuracy of the labeling standard, and may incorporate these estimates into the average confidence rate of recently added candidates. A "labeling index" is generally a record indicating portions of the document corpus to which a label properly applies. A "labelling indexer" generally refers to an application function that builds a labeling index of a document corpus, and keeps track of which documents in the corpus have been scanned for labeling.

Graphical control 293, when selected, provides a drop-down menu allowing a user to perform operations related to content management, for example: save labeling standard, load labeling standard, save labeling standard as, define corpus associated with labeling standard, define logical combination of labeling standards, close labeling standard, open new labeling standard, load a recently used labeling standard, etc. The "define logical combination of labeling standards" function allows two or more defined labeling standard to be combined logically to form a third labeling standard. For example, three labeling standards which define poor customer service could be combined logically through an OR function to identify a fraction of communication that has had at least one of these labels. As another example, a person looking for four particular plot elements in a movie database could create a labeling rule for each plot element, and then create a logical rule that finds plots which contain at least two of the plot elements through a logical combination function of each pair of plot elements which creates a combined rule that defines a labeling standard related to the union of the six logical combinations of pairs.

Graphical control 294, when selected generally provides a drop down menu allowing a user to perform operations related to the development, operation, analysis, and use history of the loaded labeling standard: view change log, view performance log, index corpus with labeling standard, manually augment labeling standard, import new examples, set index granularity, set labeling threshold, augment examples of labeling standard, augment anti-labels of labeling standard, augment labels of labeling standard, augment all components, etc. The "manual mode of label augmentation" may be provided by graphical display 200, by clearing contents to present an empty graphical control such as 235 in display area 203. After the user has completed text entry, the new text is added to the positive example set with a confirmed status. Alternatively, the selection of a manual mode of label augmentation may provide a traditional keyword index search engine that operates over the document corpus, but provides a control adjacent to each text snippet in a ranked return result. When the user selects the control to indicate positive example or negative example, the snippet is added to the labeling standard with the appropriate designation. The "import new samples" function may take a data set defined previously that includes examples marked as positive and negative, and incorporates the data set into the labeling standard. For example, a user who has performed manual searching or entry can send an email with an attachment that includes those examples perhaps without a definition of any label, but stored in a labeling standard structure. When that labeling standard file is saved locally, it can be selected by any file browser to import the examples into another labeling standard. The "set index granularity" function defines the portion size that forms candidate text, such as sentence, paragraph, some number of words, or document. The "set index granularity" function also allows a user to define how precisely the location of a positive label indication will be recorded. For example, a document level precision would record that the document tests positive for the label, but only one indication per document will be recorded. The "augment examples of labeling standard" function generally performs the function of providing computer implemented augmentation of available examples that reflect the richness of current examples in the context of a label. The "augment anti-labels in the labeling standard" function operates like the examples augmentation function, but instead of merely adding examples, alternative anti-label keyword structures are added to anti-label area 210 in addition to, or instead of adding additional examples. The "augment labels of labeling standard" function operates like the examples augmentation function, but instead of merely adding examples, alternative label keyword structures are added to the label definition display area 201 in addition to, or instead of adding additional examples. In an embodiment a set of label keyword structures are presented to the user in a display area like the anti-label display area 210, to provide alternative label sets of keywords that have been found.

Graphical control 295 is generally a function activation control that allows one of the labeling service operations to be performed for the user. By selecting graphical control 295, the function is instantly performed. In an embodiment further described herein, graphical control 295 is assigned to the "augment examples of labeling standard" function. A user might select such a control if he has received a new set of 10 positive examples and 10 negative examples manually entered by a colleague, and has imported the new examples into the labeling standard shown in graphical display 200. Another reason might be that a user has changed the corpus definition for applying the rule, and so accumulated examples can be used to extend the classified examples in the context of the new corpus. For example, the user might have first defined the document corpus to be "sales emails", which are likely to have a high standard of customer service. When the user changes the document corpus to a "technical support" corpus he is likely to find different and richer examples, and be able to take advantage of a more balanced set of negative examples.

Since the number of samples in an input label standard is miniscule (as compared to the requirements of advanced large transformer-based NLP models), other models could not be trained effectively with a small number of data samples. These large, advanced models require very rich variety (in terms of variation in ideas required to holistically represent the context-requirement) training data. It is not generally feasible to represent such richness with only a small dataset. Often, in a smaller label standard dataset, there is not sufficient variety and richness of data for a model to learn effectively the required-context-representations holistically from this dataset.

As an outcome of the augmentation function, the disclosed method 600 augments this dataset, with enough data across both classes, which is rich, and by virtue of a well-chosen corpus, human-generated. Hence the resultant augmented data represents a real-life scenario, is noise-resistance. Therefore, the result of augmentation is an improved stability and relevance model that is run from the labeling standard. The method disclosed herein is capable of creating a suitable label standard dataset for training advanced large NLP models.

The present system augments a miniscule dataset with very rich variety. The output data set is not just richer representation of individual words as a thesaurus would provide, but also rich with new ideas around the context-requirements. The output dataset finds human/enterprise-generated data, in a context-requirement aware manner. The method of augmentation disclosed herein holistically discovers new ideas with respect to a specific context-requirement as provided by the label description, and not just randomly replacing words/terms/translations/generations etc. The method of augmentation presented works in a noise-resistant manner. The produced augmented dataset could be directly used for training large and advanced NLP models. Additionally, as opposed to zero-shot/few-shot classification techniques, which require an existing (unlabelled) dataset that it classifies, the disclosed method that fulfils both augmentation and pre-classification requirements. The augmentation method disclosed automatically and intelligently acquires and buckets the data samples in the correct data sub-set, ready for any classification model.

After the user selects graphical control 295 to invoke an augmentation function, labeling service 142 receives a control signal from application 110 and in response, performs an augmentation operation involving augmentation method 600. Generally, a few positive examples and a few negative examples representing a specific context-requirement are received by method 600. The examples and labels in a labeling standard are received by method 600 to perform an augmentation operation that expands the set of examples based on the received examples and labels. The output of the augment function invoked by the selection of graphical control 295 is generally an improved label standard with a larger context-requirement-aware dataset with more positive and negative class specific data samples, that are rich in variety. That is, the set of examples have varied ideas around the required-context, even when these ideas are not present in the miniscule set of input samples. Additionally, the generated samples are non-synthetic, that is they are not generated by mere spot perturbations of a string using generative models. This dataset is ideally suited for training advanced large NLP models that require a large volume of rich data, for which currently manual acquisition and grading is required.

The augmentation method generally receives the set of examples, such as the set of currently defined examples in a labeling standard, e.g. by receiving the labeling standard from storage service 180. The augmentation method then loops through the set of examples, taking one example at a time and an associated label. In an embodiment, the label chosen is the anti-label that is associated with a negative example, or the label associated with a positive example. Where there are multiple available labels (e.g., where there are several anti-labels available) multiple combinations of label and example may be used. In another embodiment, a label is randomly chosen from the set of available labels of the same class.

Once an example and label are selected, the method 600 begins the augmentation method at step 603. At step 605 method 600 receives the candidate text from the current example. In an exemplary case, a previously classified sample shown in graphical control 202 "I would be happy to help you with your sprocket order" has been classified as a positive example, and so is received by method 600. At step 610 the method 600 receives an input label such as the graph corresponding to the input label shown in graphical control 206, or the ordered list shown in graphical control 292, consisting of the list "service harmony."

At step 615, a set of prioritized keywords is prepared. In this step, summary keywords are extracted and their respective strengths are computed in a context-aware manner. That is, strength of each priority keyword is computed. The computation is aware of the context-requirement in the label-description. This context aware set of keywords is obtained for both negative and positive examples. In general, the descriptive label text input may be a raw text string containing multiple terms and the candidate text is a raw text string containing multiple terms. The label standard could store the prioritized keywords for the candidate-label pair. In that case the prioritized candidate-label keywords are received by method 600 from storage service 180 to prepare a set of prioritized keywords. Alternatively, the keyword summary structure for the candidate text and/or the label may be available in the label standard. These structures, when available are received from storage service 180. The method of performing step 615 begins at step 703, and proceeds to step 705. If the label structure is not available from storage 180, a test is performed to determine if the label contains multiple words. Many context-requirements are not possible to explain in a single term. More complex label ideas require a collection of ideas. Modern NLP, that use large, advanced transformer-based models, excels in creating rich models that could smartly classify such data. But these models also require rich training data to learn the underlying concept holistically under varying representation of different ideas that makes the concept-requirement. Since all the underlying ideas could neither be holistically represented in the minuscule input data samples, nor in a single term for label-requirement, a context-requirement is represented as label-description instead of a single term label-requirement.

If the label contains multiple words, the method proceeds to step 710. The summary keyword structure is determined from the input label description as described elsewhere with method of performing step 710 of FIG. 9. The method returns to step 715, where a candidate text structure providing prioritized text keywords is obtained. The method of step 715 proceeds as the method of step 710 but with different input text to summarize, namely the candidate text. For example, the candidate text "I would be happy to help you with your sprocket order" may determine a list of significant keywords such as [helping, community-focus, happy, customer, sprocket]. The ordered list of priority keywords with priority is [(helping, 0.35), (community-focus, 0.35), (happy, 0.2), (customer, 0.1)]. The resultant graph is illustrated in structure display 1100 of FIG. 11, which shows an illustration of candidate graph 1110, with helping vertex 1112, community-focus vertex 1114, happy vertex 1116, and customer vertex 1118. The tags display 1160 shows that the social values tag has been assigned to helping, community-focus and service. The people tag has been assigned to customer. The feeling/sentiment tag has been assigned to happy and harmony. The graph structure shown provides richer terms, and also a richer order description which includes not only order but also strength and similarity. Tags, linkage and directions are available for richer query building for following processes. When the keyword summary method of performing step 710 concludes, the priority keywords are [helping, community-focus, happy, customer].

In an embodiment, different size criteria is used for the case of summarizing candidate text. The method proceeds to step 720 where embeddings are obtained for priority terms of text keywords. At step 725, the embedding vectors for the priority terms of the label keywords are obtained. For example, each term of the candidate text is provided an embedding vector and the list is filtered to retain only priority terms. At step 730, the similarity between priority label terms and the priority candidate keywords are obtained. This might be obtained by computing similarity, e.g. cosine similarity between the embedding vectors of each priority term in the anti-label and each priority term in the inverted text. At step 735, the contextual importance is computed for priority text terms. In an embodiment, the contextual importance of each summary keyword term is computed as the normalized weighted average of similarity between each term in the label, where the weights are the label term's importance score. At step 740, the method determines the context-aware priority from contextual importance and keyword priority. For example, the context-aware priority of each summary keyword can be computed as the normalized product of contextual-importance and keyword-priority. In the present example, the context-aware priority keywords are "helping, happy, customer." The computation of the context-aware priority keywords terminates at 797 and the method returns to step 620 of FIG. 6.

At step 620 a set of ranked search retrieval results are obtained. A search service 164 searches over the labeling document corpus such as corpus 154 is performed using the context-aware keywords as the query. A number of top ranked search returns is obtained from search service 164. For example, say the top n (say n=10) search results are retrieved when the 'context-aware' terms are used to search for relevant documents on a given search engine. Most search engines, also generates the snippets of text, indicating why they believe that the retrieved search result is relevant to the query. In step 625, the method collects these snippets to augment the database. An embodiment uses an API version of a search engine. An embodiment uses a client version of the search retrievals of top-N search results, and respective snippet extractions (at step 625). Exemplary ordered context-aware keyword terms for the input to this step are "helping, happy, customer." This input can be further enriched based on the class requirement prompt, that is, a prompt to ensure that positive sentences are produced and that negative sentences are produced. For example, a graphical control 236 can prompt a user to confirm a positive example that has been found. A prompt at graphical control 252 can prompt a user to confirm that a negative example has been found.

At step 625, a text snippet is obtained and the method proceeds to step 630 to quantify a confidence that the text snippet belongs to the label class. An exemplary method to quantify class confidence is to construct a keyword structure for the text snippet, e.g. using method of performing step 710 of FIG. 9. An exemplary method of evaluating an overall semantic similarity between the keyword structure of the text snippet and the label keyword structure could be the use of cosine similarity based on a vectorized transformation of graph terms, or some other method provided by vectorization functions 156. Other methods are disclosed herein provide a similarity score or an estimate of probability that a label properly applies to the text snippet. If the probability is too low at decision 635, the method indicates failure at 640 by recording the failed snippet in storage service 180, and returns to step 625 to obtain another text snippet, which is in turn quantified at step 630, and tested at step 635. When the class confidence is sufficient at decision 635, the method proceeds to step 645 where the input is augmented to include the sufficient snippet as an example.

In an embodiment, step 630 uses method 300 of determining the confidence that the label is properly applied to the text snippet, using the text snippet as the candidate input at 305, and the label as the candidate label at step 310. The output estimated label probability of method 300 is then used as the class confidence. At step 307, the label is already known, and so the method proceeds to step 372. At step 372, in an embodiment, the anti-label is produced by labeling service 142 from the label standard that has stored the anti-label in memory, and the method proceeds to step 315.

At step 320, the method decides that an example of the candidate label is available, and so the method proceeds to step 335 where an example of the candidate label is received. In an embodiment, K examples of the positive label are received if available, where K is a non-negative integer. In an embodiment of step 335, an example is randomly chosen from the set of positive examples. In an embodiment of step 335, a set of highest confidence examples of the label is used to randomly select K of the top L examples in the positive set. In an embodiment of step 335, the set of examples used to obtain a positive example is restricted to be the set of positive examples that belong to the same cluster of similar examples.

At step 325, the method decides that an example of the candidate anti-label is available, and so the method proceeds to step 340 where an example of the candidate anti-label is received. In an embodiment, K examples of the negative label are received if available, where K is a non-negative integer. In an embodiment of step 340, a set of highest confidence examples of the anti-label is used to randomly select K of the top L examples in the negative set. In an embodiment of step 340, the set of samples used to obtain a negative example is restricted to be the set of negative examples that belong to the same cluster of similar examples.

In an embodiment, K and/or L are parameters set by the user to control the augmentation method 600. In an embodiment a balanced set of K negative and K positive examples are obtained, if available.

The method proceeds from step 315 to step 380 where one or more label scoring methods are applied. At step 385, the performance records are accumulated and available weights for a label similar to the present label are sought. At step 390, if weights were found, they are applied, and a weighted label score is determined, otherwise the label score is determined from the set of label scores determined at step 380, and at step 395 a result is rendered based on the estimate. In the present instance of method 300, the rendered result is to provide the determined label score as a label class confidence to method 600, to be tested at step 635. The method 300 then proceeds to step 397 where a new input is awaited from the user or from the augmentation function.

Noise in augmentation is a challenge, particularly for a perturbation system that is not performed in-place. Noise in augmentation is also a challenge for AI based alternate systems that intend to either augment or generate data for training complex models. Even though there is a certain probability that a sample belongs to a class, when little data is available, there will also be some samples that are included in the class that are not good representatives of the class. The noise from these samples needs to be reduced. The present system provides a method of reducing noise that works for a small sample size.

At decision 635, when the class confidence is sufficient, the method proceeds to step 645 where the set of positive examples is increased by storing the text snippet as a positive example in the label standard. The method then proceeds to check for additional user input, or additional input from the labeling service 142 at decision 650, and when there is no additional user input, the method proceeds to decision 655 where a test is performed to determine if each new example found should be "balanced" or complemented by a negative example that complements the new positive example which has been found. To increase the richness and scale of the augmented data, the augmentation function creates both a negative and a positive class augmentations from each example, irrespective of its original class. Therefore, for example a positive class sample is also converted to a negative class sample synthetically to ensure that there is a balancing subgraph produced. There is an advantage in some label decisions for the data to have a balance of representations of a particular idea. Embodiments of creating a balanced example could include, for example thesaurus-based methods, antonym replacement methods, or negative vector-based embedding methods etc.

The criteria to determine decision 655 may be a user setting of labeling service 142, a label standard setting, or an augmentation function setting. If the decision 655 determines that the newly found positive example should be balanced, the method proceeds to step 660 where the data needed to obtain an anti-label example related to the recently found positive example is determined. In an embodiment, the anti-label data determined at step 660 includes a set of priority keywords of the text snippet, an inversion of the set of priority keywords of the text snippet, a set of priority keywords of the anti-label, and a set of context aware keywords of the inversion of the priority keywords of the text snippet in the context of the priority keywords of the anti-label. Having obtained a set of context aware keywords of the inversion of the text snippet in view of the context of the anti-label, the method proceeds to step 620 where a set of ranked search retrieval results is obtained for the set of context aware keywords. The method then proceeds to find a negative example, through steps 625, 630, 635 and 640, using the method described herein for the positive example, but using different inputs, which are appropriate and complementary for finding a negative example, as also described herein. The inputs received by method 600 include the negative text context aware keywords (to represent candidate text) and the anti-label (to represent the candidate label). When a negative example is sought by the augmentation method 600, complementary data is used to obtain an augmented negative example at step 645 of sufficient class confidence.

At decision 650, a test is performed to see if there is any user input, or if there are any remaining examples that have not yet been augmented. If an additional input is received, the method 600 proceeds to step 665 where the additional input is processed. If there is an additional example to be augmented, the method proceeds to step 605 where the candidate text is received, and the method repeats for the new input data. At step 650, if the user has provided additional input, the method uses the additional input at step 665 to use the input to provide improved augmentation. For example, if a newly obtained example was displayed to the user in display area 235, and the user had selected confirm, or green using control 236, step 665 would record that example as a strong example, and proceed at step 620 by adding that example to the set of samples to generate additional examples. Alternatively, if the user had judged the newly found example to be poor, he would enter an input into control 236 of reject or red, and the method would proceed to step 620 using a new example from the set of examples to augment which had defined prioritized keywords. Alternatively, if the keywords were not yet defined, the method would proceed to step 605. Additionally, if user had modified the label, providing a modified label definition input into graphical control 206, the method would reset, and begin the augmentation method at step 606 with a new label, looking at all examples to be duplicated in light of the new label.

When the decision 650 determines that there is no new user input, and no additional examples to be considered for augmentation, the method displays an augmentation complete notice, and effectively waits by periodically sampling input state at decision 650 until there is additional input. In the steps of data augmentation invoked by selecting graphical control 295, the augmented text is verified using noise filtering to determine that the predicted class of a selected snippet matches the intended class. In an embodiment, a threshold sets the acceptable level of confidence for accepting a sample. In an embodiment, the number of query returns from the context aware keywords is exhausted without finding a suitable candidate. In this case, the example is effectively skipped, and an error message is stored. When the augmentation method completes the statistics of augmentation are summarized for the user, and presented to the user in a display area such as graphical display 200, so that the user receives an indication of the extent of success of the augmentation function. In an embodiment, a number of successful positive class examples added is displayed in area 203, a number of negative class examples added is displayed in area 205, and a number of skipped samples is displayed in display area 201.

In documenting the label standard, a description of the positive class such as "service harmony" is sought. The system shown in operating environment 100 determines such a representation from a descriptive input such as "Pleasant and business-like." The positive class then is generally sentences that show positive features of being of service to a customer and of promoting customer happiness and loyalty. To get a rich definition of the class sought it is also helpful to have examples of sentences that reflect either disservice or disharmony. A system such as that shown in operating environment 100 provides for the creation and augmentation of a set of examples that are semantically rich, with varied ideas, balanced, and filtered for strength of representation. When sentences show neither a positive nor a negative trend in the service harmony label, they are generally labelled inert or yellow. Certain contexts allow for two thresholds to be set up for a sentence given the distance from the inert case, rather than the distance from the opposite case. Such samples that reflect the inert case can be drawn from either positive or negative examples, and found to be not particularly close to the parent example.

The idea of a text is generally the meaning of a sentence without specific attribution to the words/sequences used in it. For example, these two sentences have the same idea:

The dog could not cross the street, as it was too tired.
The hound could not cross the path, as it was fatigued.

The richness of a translation is a generally varied expression while keeping the same idea. Below are two examples where there is a lot of richness in the augmentation of the text from one form to another, but they still represent the same idea.

The dog could not cross the street, as it was too tired.
My pet seemed uninclined to go the extra mile to the other side of St. Peter's.

Richness in idea is generally an expression of the same idea from different perspectives. Below are the examples of two sentences under the same context (e.g., 'sentences depicting service harmony'), but with very different idea.

I like working in customer service, because it makes me feel good to take a customer who is having a problem and, through service and kindness, turn him into a fan.
I hear you; you are saying that you are frustrated that I don't know the answer to your question, so let's look at the documentation together and see if I can get you the information you need.

Generally advanced NLP models need richness in idea across training samples belonging to the same label to effectively train a label classifier.

The disclosed solution is superior to other approaches. Actual, rich, human created data for specific training context requirement is the 'Gold' standard for training any NLP model. But other methods do not provide an effective method to augment 'rich', 'human generated, context-requirement-aware, training data for advanced, large NLP models. Since the 'Manual' modes of data acquisition and labelling are neither scalable, and nor cost-effective for the scale of data required for these advanced models (which could be 100× to 100000× more than that of any traditional NLP model), the present disclosure can be evaluated by comparison to other scalable approaches.

Other methods of data-augmentation do not provide richness or context awareness. A comparison of final model outcome will be made with other approaches that do not use the methods disclosed herein, or those same methods when they take advantage of the augmentation using one or more methods and sub-methods in the disclosure. A best baseline is followed while using a Few-Shot approach with an advanced large pre-trained transformer-based NLP model (e.g., Microsoft Turing).

The proposed methods, besides having a main intelligent, scalable, and context-requirement-aware data augmentation method, also have additional methods to make the augmented data Noise-Resistant. The data shows by the below performance of both the main data-augmentation module in isolation, and with the Noise-Reduction add-on, as compared to the baseline performance delivered by a modern, and advanced, large transformer-based NLP model (e.g., Microsoft Turing), on same data samples without these modules. The method takes different sized subsets of a standardized dataset with samples in the range of 20 (10 each positive and negative trend) to 100 records ONLY with respect to a specific context-requirement/label-description).

For such large models, this number of training samples is considered by others to be miniscule and training a decent performance model for any real-life application considered impossible. This fact is validated by the sub-optimal performance of the trained model on such small representative datasets without this technology. "Recall" for an NLP system ranges from 4% to 8% for sample size ranging from 20 to 100 samples. All validation/testing of the final trained model were done on a validation dataset made for the same context-requirement (label-description), but had many different, richer, and varied 'ideas', around the context-requirement, than can be practically presented in the handful of the training samples available to train the model. This scenario atypically represents the case even for much (1000×) larger training dataset acquired from limited data sources (e.g., from a portal for a given topic, or frequented by a particular class/sub-set of target audience).

Next, using the same data samples (not just similar sized data), the system of operating environment 100 implements the disclosed method once with only the Scalable, Intelligent, and Context-Requirement Aware method flow without the Noise-Reduction add-on module. This method provided between 8% recall and 17% recall for sample size between 20 and 100. When noise reduction is performed, the performances is similar, however there is an early advantage of a 14% recall at sample size 40. In both the conditions, the disclosed methods delivered far better results than the baseline. Also with smaller data sample sizes, the Noise-Reduction add-on module as disclosed provided even better results.

The disclosed method augments training data for large, advanced NLP data with which the underlying model could deliver better recall/FPR/accuracy, and due to the richness and variation of ideas of data it could augment, the model could learn the context better, and more holistically, which means that the model could perform reasonable better for new data/domain.

The augmented samples are search based, and hence are human/enterprise generated actual samples, this ensuring that under real-life applications the models trained on these systems are more reliable, and stable.

The disclosed method could augment huge amounts of realistic human/enterprise-created training data for even advanced transformer-based NLP models, which require very diverse representations of ideas to learn rich contexts.

The disclosed method is context-requirement aware (as opposed to just changing any word with its synonym/antonym or adding/replacing random words). This is a huge benefit, as this not only reduces the noise largely for any downstream model, but also ensures more relevant training data for the downstream models, thus improving the model's performance, accuracy, relevance, reliability, and stability.

Manually acquiring and grading data for large models is insufficient:

First, because advanced and large transformer-based NLP models need at a very minimum thousands of samples of very rich representation data. Such data is difficult to obtain from a single source, is time consuming, and very expensive. Such approaches had worked in the past for traditional models (coupled with other non-AI based augmentation techniques), but do not scale to the modern NLP eco-system.

Second, because even on acquiring such data from multiple data sources, these data need to be graded, with all the nuances of time, cost, and most importantly bias related to grading of such data.

Figure 14:
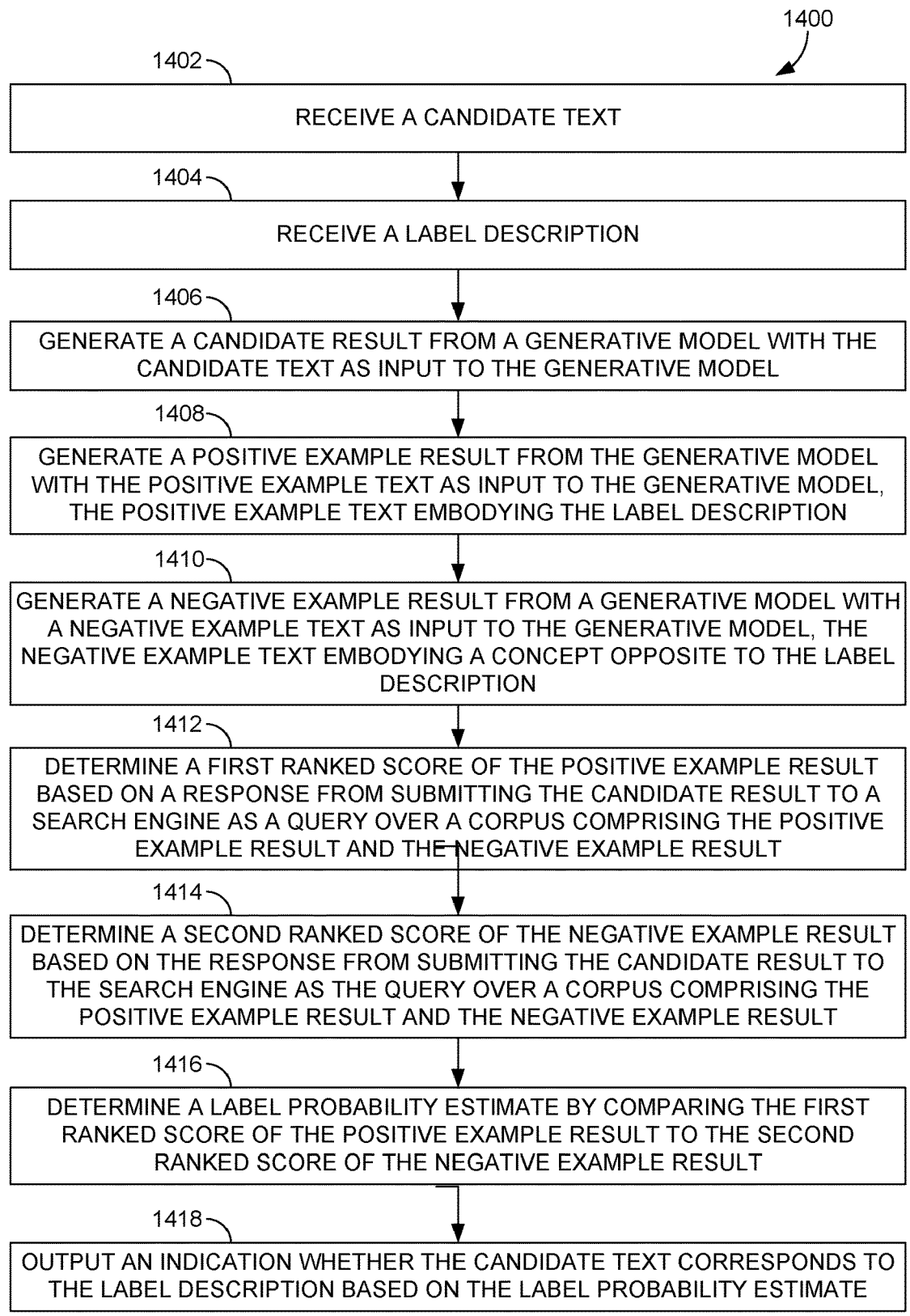
FIG. 14 is a flowchart showing a method for determining a correspondence between a class label and a text, in accordance with an aspect of the technology described herein.
Figure 15:
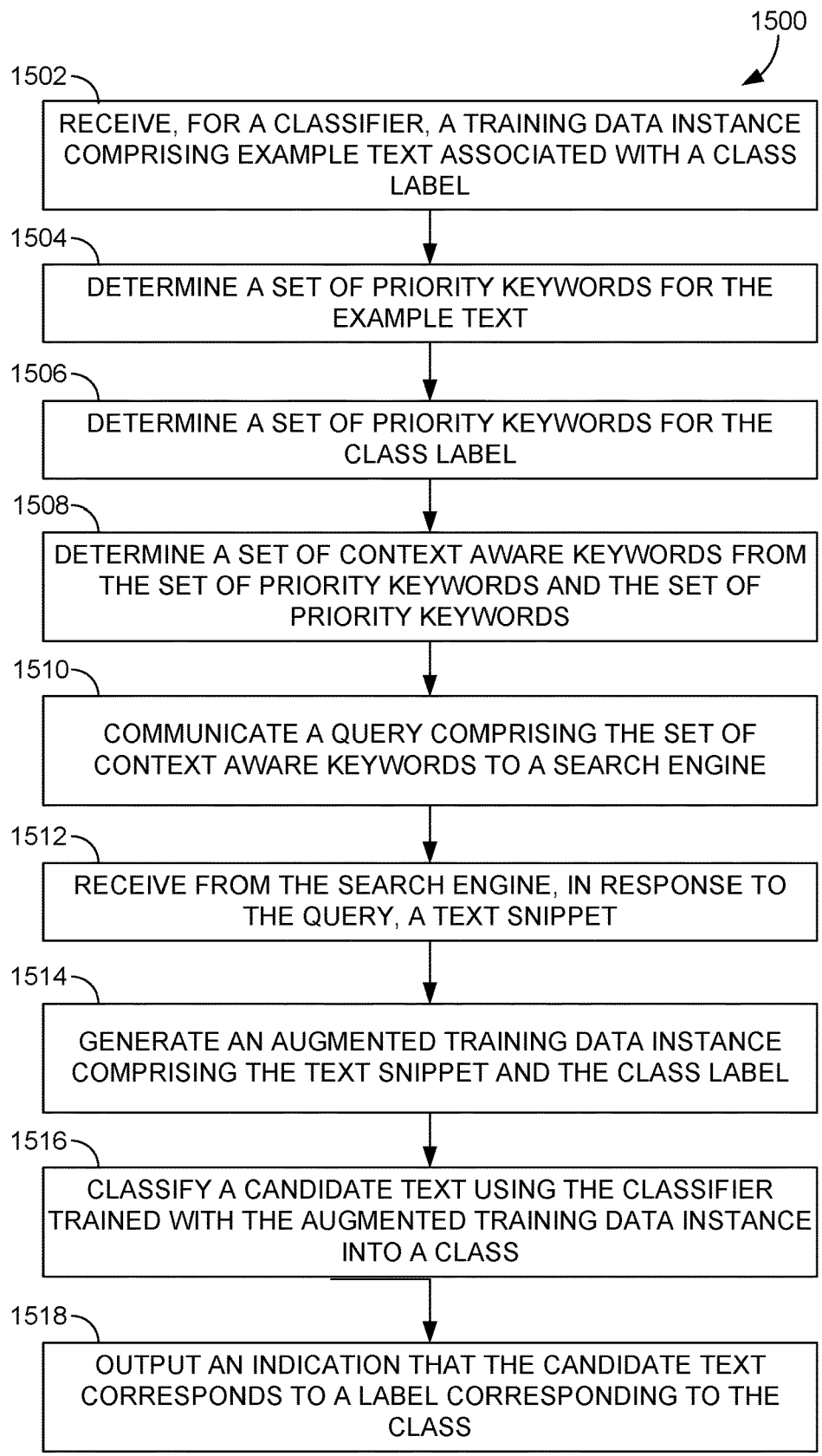
FIG. 15 is a flowchart showing a method for augmenting training data for a classifier, in accordance with an aspect of the technology described herein.

Now referring to FIGS. 13-15, each block of methods 1300, 1400, and 1500, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), or a plug-in to another product, to name a few. In addition, methods 1300, 1400, and 1500 are described, by way of example, with respect to the systems and methods of FIGS. 1-12. However, these methods may additionally or alternatively be executed by any one system, or any combination of systems, including, but not limited to, those described herein.

FIG. 13 is a flow diagram showing a method 1300 for a method for determining a correspondence between a class label and a text, in accordance with some embodiments of the present disclosure. The method 1300, at block 1302, includes receiving a candidate text. As described previously with reference to FIG. 2, the candidate text may be received through a user interface. Alternatively, the candidate text may a group of documents, emails, or other source of text. In aspects, the candidate text may be a portion of a larger document, such as a sentence, phrase, or paragraph of a document. The method 1300, at block 1304, includes receiving a label description. As described previously with reference to FIG. 2, the label description may be received through a user interface. A user may submit the label description with the purpose of determining whether one or more documents, emails, texts, social media posts, or other textual content correspond with the label description. For example, the user may wish to identify documents that embody customer service. Method 1300 may determine whether the label description corresponds to the candidate text. The label corresponds to the candidate text when concepts in the text and label description have a similar meaning.

Figure 7:
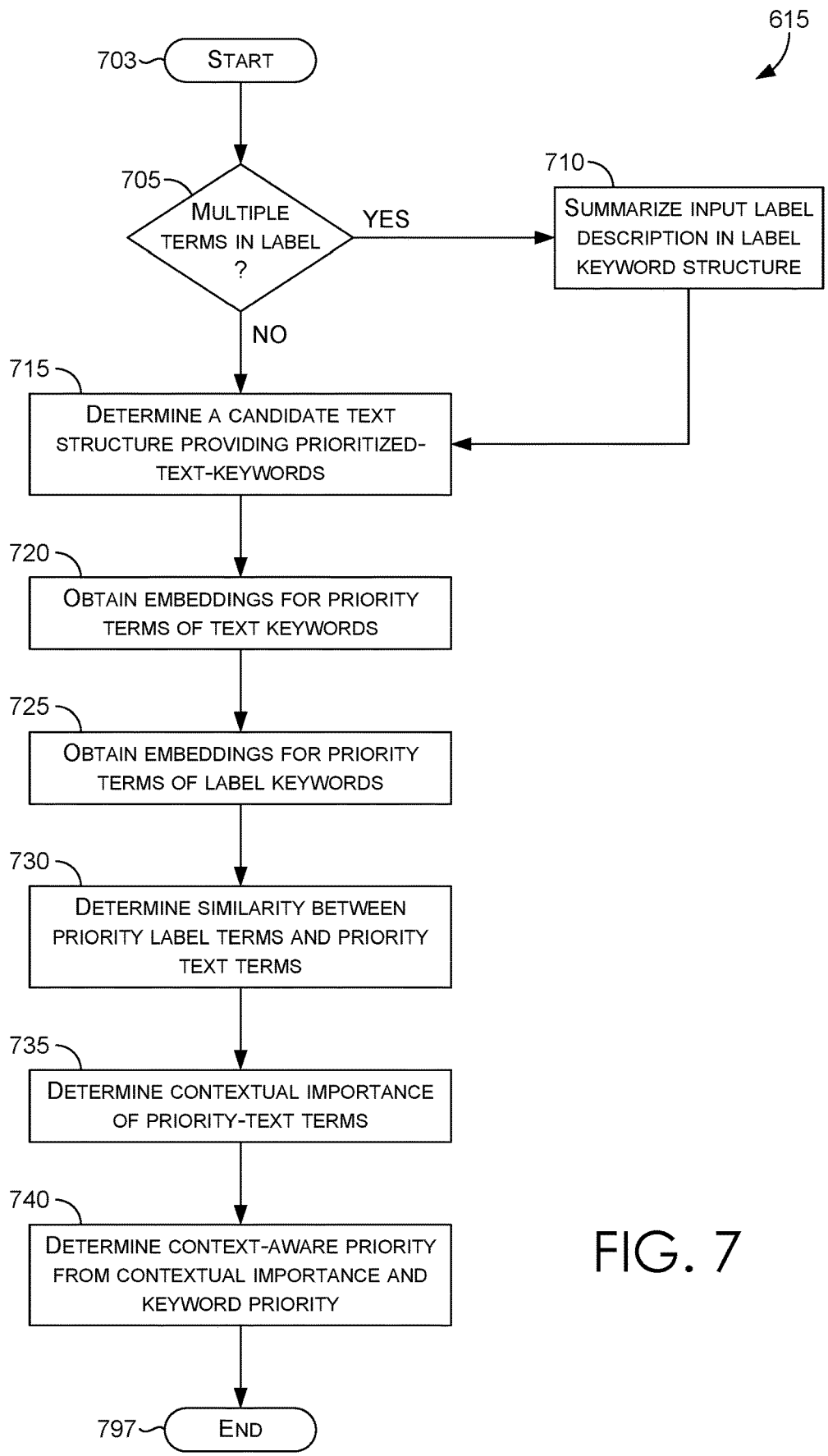
FIG. 7 is a flowchart of a method of producing a set of context-aware keywords based on a prioritized set of keywords in the context of a label, in accordance with an aspect of the technology described herein.

The method 1300, at block 1306, includes using the label description to generate a query. For example, prioritized keywords derived from the label are used as the query as explained with step 615 and step 620 of FIG. 6. Alternatively, the prioritized keywords derived from the label are used in conjunction with prioritized keywords derived from an example to form a set of context-aware keywords as with step 615 as shown in FIG. 7.

The method 1300, at block 1308, includes communicating the query to a search engine. Labeling service 142 sends the query to search service 164. In an embodiment, the search service 164 is an API version of a search engine. In an embodiment, a client version of the search is used. Search service 164 receives the query and performs a search over a document corpus 154. The search engine determines a block of ranked retrieval results including a rank for each result and a search score for each result, and a text snippet that samples the document at a location relevant to the query. Search service 164 obtains the set of ranked search results as discussed in conjunction with step 620 of FIG. 6.

The method 1300, at block 1310, includes receiving from the search engine a text string that is responsive to the query. Search service 164 sends a result page that includes the set of ranked search results to labeling service 142 which includes a text snippet for each ranked search result. In some cases an entry of high rank or high search score relevance is selected by labeling service 142, selecting the text snippet as the text string. In some cases, as explained in conjunction with FIG. 6, a loop is formed in which the list of ranked search results are evaluated by obtaining a text snippet as explained in step 625, quantifying a label class confidence of a text snippet at step 630, and deciding at decision 635 if the text snippet has the proper class with sufficient confidence. If not, the method records failure of that snippet at step 640 and returns to step 625. When a text snippet of sufficient confidence is found at step 635, the text snippet that was found to be of sufficient confidence is selected as the text string responsive to the query.

The method 1300, at block 1312, includes inputting the text string and the candidate text to a generative model. The text string is basically a positive example or a negative example, and so it is used in conjunction with the example processing as disclosed herein. In some cases a parameter is retrieved from storage 180 which indicates amount of risk of the generative model. There are four basic methods described herein for inputting an example text string into the candidate model, as described for the NC method (FIG. 4 step 410 and step 420), the SL method (FIG. 4 step 410 and step 420), the SS method (FIG. 5 step 510 and step 520), and the LP method (FIG. 12 step 1210, step 1220, and step 1230). The mode of the generative model in some embodiments is a zero-shot mode.

The method 1300, at block 1314, includes receiving a generated text from the generative model, the generated text comprising a plurality of tokens and associated probabilities. Generated text broadly includes the actual stream of text tokens produced by the model, as well as an associated token probability reported for each token, and a vector of log probabilities where each log probability describes a set number likelihoods corresponding to tokens that the model might have chosen. As described above, there are four basic methods disclosed herein for receiving generated text from the generative model, as disclosed in the NC, LP, SS and LP methods. In the NC method shown in FIG. 4, the text is received and scanned for a class label as described in conjunction with the NC embodiment of step 420. In the SL method shown also in FIG. 4, the text is received and scanned for keywords of the label and of the anti-label as described in conjunction with the SL embodiment of step 420. In the SS method, shown in FIG. 5, the generated text is used in a search query as described in step 530. In the LP method shown in FIG. 12, the log probabilities are used in conjunction with steps 1215, 1225 and 1235.

The method 1300, at block 1316, includes determining a label probability estimate based on the generated text. Again, we have the four basic methods of determining label probability as disclosed in the NC, SL, SS, and LP methods. In the NC method, in step 430, a token probability of label number or anti-label number is used as in input to an approximation, which, in some embodiments, uses experimentally estimated scaling factors. In the SL method, in step 430 the token probability of keywords of the label or anti-label or synonyms of them are used to form an approximation of the strength of a label indication as opposed to an anti-label indication. In the SS method at step 540, a reconciliation rule is used to balance the rank of positive example documents as opposed to negative example documents. In the LP method, at steps 1250 the results that exceed a threshold of predictability provides scaling to positive probabilities and to negative probabilities to approximate a label probability.

The method 1300, at block 1318, includes outputting an indication whether the candidate text corresponds to the label description based on the label probability estimate. As described previously with reference to FIG. 2, the indication may be output through a user interface. In one aspect, the indication may be a binary yes/no or similar indication. In other aspects, the indication may express a degree or strength of correlation.

FIG. 14 is a flow diagram showing a method 1400 for a method for determining a correspondence between a class label and a text, in accordance with some embodiments of the present disclosure. The method 1400, at block 1402, includes receiving a candidate text. As described previously with reference to FIG. 2, the candidate text may be received through a user interface. Alternatively, the candidate text may a group of documents, emails, or other source of text. In aspects, the candidate text may be a portion of a larger document, such as a sentence, phrase, or paragraph of a document. The method 1400, at block 1404, includes receiving a label description. As described previously with reference to FIG. 2, the label description may be received through a user interface. A user may submit the label description with the purpose of determining whether one or more documents, emails, texts, social media posts, or other textual content correspond with the label description. For example, the user may wish to identify documents that embody customer service.

The method 1400, at block 1406, includes generating a candidate result from a generative model with the candidate text as input to the generative model. Method 1400 may determine whether the label description corresponds to the candidate text. The label corresponds to the candidate text when concepts in the text and label description have a similar meaning. In an embodiment a label is an abstraction or category that properly describes several examples, which each embody the label or are a concrete example that fits the label. The step of generating a candidate result from a generative model with the candidate text as input to the generative model is described in step 520 of FIG. 5. An example of candidate text input from graphical display 200 is "I would be happy to help you with your sprocket order" as shown in graphical control 202.

The method 1400, at block 1408, includes generating a positive example result from the generative model with the positive example text as input to the generative model, the positive example text embodying the label description. Steps 1408 and 1410 are generally described in step 530 of FIG. 5. In the example shown in graphical display 200, a positive example text might be "Let me know if there's anything else I can do for you. I'm happy to help" as shown in display area 231.

The method 1400, at block 1410, includes generating a negative example result from a generative model with a negative example text as input to the generative model, the negative example text embodying a concept opposite to the label description. An example of negative example text shown in graphical display 200, might be "This is your problem, not mine" as shown in graphical display area 261.

The method 1400, at block 1412, includes determining a first ranked score of the positive example result based on a response from submitting the candidate result to a search engine as a second query over a corpus comprising the positive example result and the negative example result. A ranked score could be a numerical rank, 1, 2, 3, where the lower number value actually reflects the higher rank (first listed). The ranked score may be a cosine similarity between the candidate result and the positive example result.

The method 1400, at block 1414, includes determining a second ranked score of the negative example result based on the response from submitting the candidate result to the search engine as the second query over a corpus comprising the positive example result and the negative example result. The rank score may be, for example a cosine similarity between the candidate result and the negative example result. A similarity measure may be measured in a deep vector space using a sematic search engine.

The method 1400, at block 1416, includes determining a label probability estimate by comparing the first ranked score of the positive example result to the second ranked score of the negative example result. The reconciliation rules disclosed herein may be used to estimate probability. In an embodiment label probability is a scaled comparison between the average positive example cosine similarity and the average negative example cosine similarity. In an embodiment, a scaling factor is determined by finding the cosine similarity of randomly selected text as a diminishing factor. In an embodiment a scaling factor is determined by measuring rates of user confirmation as a factor.

The method 1400, at block 1418, includes outputting an indication whether the candidate text corresponds to the label description based on the label probability estimate. In one aspect, the indication may be a binary yes/no or similar indication. In other aspects, the indication may express a degree or strength of correlation.

FIG. 15 is a flow diagram showing a method 1500 for a method for a method for augmenting training data for a classifier, in accordance with some embodiments of the present disclosure.

The method 1500, at block 1502, includes receiving, for a classifier, a training data instance comprising example text associated with a class label. The training data instance may be provided by a user through an interface. In another aspect, the training data is pulled from a collection of training data.

The method 1500, at block 1504, includes determining a set of priority keywords for the example text. The priority keywords are determined, for example, as described in conjunction with FIG. 9.

The method 1500, at block 1506, includes determining a set of priority keywords for the class label. The set of priority keywords determined for the class label are determined, for example, as described in step 307 of FIG. 3, and in FIG. 9.

The method 1500, at block 1508, includes determining a set of context aware keywords from the set of priority keywords and the set of priority keywords. The method of determining a set of context aware keywords is described in FIG. 7. An example of context aware keywords may be "helping, happy, customer" as shown in display area 204 of graphical display 200.

The method 1500, at block 1510, includes communicating a query comprising the set of context aware keywords to a search engine. Labeling service 142 sends the query that includes the context aware keywords to search service 164. In an embodiment the search service 164 is an API version of a search engine. In an embodiment, a client version of the search is used. Search service 164 receives the query and performs a search over a document corpus 154. The search engine determines a block of ranked retrieval results including a rank for each result and a search score for each result, and a text snippet that samples the document at a location relevant to the query. Search service 164 obtains the set of ranked search results as discussed in conjunction with step 620 of FIG. 6.

The method 1500, at block 1512, includes receiving from the search engine, in response to the query, a text snippet. Search service 164 sends a result page that includes the set of ranked search results to labeling service 142 which includes a text snippet for each ranked search result. In some cases an entry of high rank or high search score relevance is selected by labeling service 142, thus selecting the text snippet. In some cases, as explained in conjunction with FIG. 6, a loop is formed in which the list of ranked search results are evaluated by obtaining a potential text snippet as explained in step 625, quantifying a label class confidence of a potential text snippet at step 630, and deciding at decision 635 if the potential text snippet has the proper class with sufficient confidence. If not, the method records failure of that snippet at step 640 and returns to step 625. When a potential text snippet of sufficient confidence is found at step 635, the potential text snippet that was found to be of sufficient confidence is selected as the text snippet to be returned, in response to the query.

The method 1500, at block 1514, includes generating an augmented training data instance comprising the text snippet and the class label. In an embodiment the labeling standard is increased by including an additional example that comprises the text snippet and that is associated with the class label. The methods of storing, modifying and enhancing a labeling standard to include an additional example for the labeling standard as disclosed herein, are examples of generating an augmented instance (or labeling standard) that includes the text snippet or the new example of the class label.

The method 1500, at block 1516, includes classifying a candidate text using the classifier trained with the augmented training data instance into a class.

The method 1500, at block 1518, includes outputting an indication that the candidate text corresponds to a label corresponding to the class. In one aspect, the indication may be a binary yes/no or similar indication. In other aspects, the indication may express a degree or strength of correlation.

Exemplary Operating Environment

Figure 8:
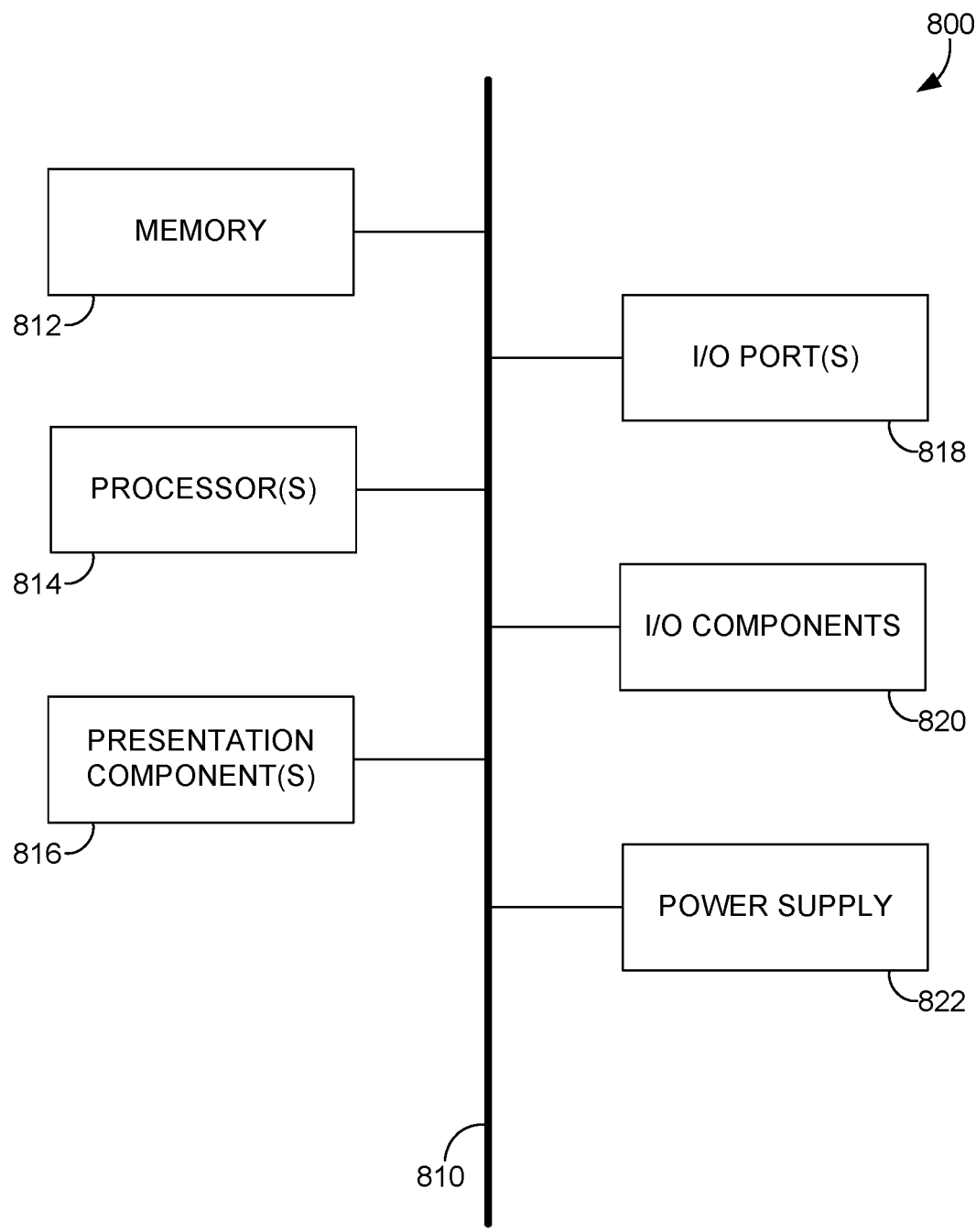
FIG. 8 is a block diagram of an exemplary computing environment suitable for use in implementing aspects of the technology described herein.

Referring to the drawings in general, and initially to FIG. 8 in particular, an exemplary operating environment for implementing aspects of the technology described herein is shown and designated generally as computing device 800. Computing device 800 is but one example of a suitable computing environment and is not intended to suggest any limitation as to the scope of use of the technology described herein. Neither should the computing device 800 be interpreted as having any dependency or requirement relating to any one or combination of components illustrated.

The technology described herein may be described in the general context of computer code or machine-useable instructions, including computer-executable instructions, such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 8, computing device 800 includes a bus 810 that directly or indirectly couples the following devices: memory 812, one or more processors 814, one or more presentation components 816, input/output (I/O) ports 818, I/O components 820, and an illustrative power supply 822. Bus 810 represents what may be one or more busses (such as an address bus, data bus, or a combination thereof). Although the various blocks of FIG. 8 are shown with lines for the sake of clarity, in reality, delineating various components is not so clear, and metaphorically, the lines would more accurately be grey and fuzzy. For example, one may consider a presentation component, such as a display device, to be an I/O component. Also, processors have memory. The inventors hereof recognize that such is the nature of the art and reiterate that the diagram of FIG. 8 is merely illustrative of an exemplary computing device that may be used in connection with one or more aspects of the technology described herein. Distinction is not made between such categories as "workstation," "server," "laptop," "handheld device," etc., as all are contemplated within the scope of FIG. 8 and refer to "computer" or "computing device."

Computing device 800 typically includes a variety of computer-readable media. Computer-readable media may be any available media that may be accessed by computing device 800 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 812 includes computer storage media in the form of volatile and/or nonvolatile memory. The memory 812 may be removable, non-removable, or a combination thereof. Exemplary memory includes solid-state memory, hard drives, optical-disc drives, etc. Computing device 800 includes one or more processors 814 that read data from various entities such as bus 810, memory 812, or I/O components 820. Presentation component(s) 816 present data indications to a user or other device. Exemplary presentation components 816 include a display device, speaker, printing component, vibrating component, etc. I/O ports 818 allow computing device 800 to be logically coupled to other devices, including I/O components 820, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 814 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 800. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

Embodiments

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

For example, a labeling service 122 that labels documents over a corpus 154 at times discussed an enterprise corpus of CRM data, but a labeling service can label portions of a document over any corpus of documents. The corpus 154 could be a personal hard drive, a portion of cloud storage, a set of web pages, a movie database, etc.

Additionally labeling application 110 was generally described as an application that provides a labeling result. The labeling application 110 can be combined with a search service 164 through advantageous combinations. For example, a larger set of results from a search service 164 can be filtered through a labelling service to eliminate those returns that do not fit a label. As a further example, search service 164 can be configured to return 100 most relevant returns, and those returns that are relevant to a label could be moved to the top of a ranked list. In an embodiment, a user types in a label description into graphical control 206, and a search service 164 returns to the user a set of entries presenting possible positive examples, and a set of entries presenting possible negative examples. The user selects a positive example and a negative example, and the method proceeds to perform method 300 with a positive example taken from the text snippet of the user-selected positive entry, and negative example taken from the text snippet of the user-selected negative entry. The search service 164 then hands over processing to labeling service 142. The labeling service 142 proceeds to perform entry filtering for search service 164 by calling method 300 with each text snippet from each entry returned by the search service 164 being evaluated as candidate text, in light of the label entered by the user, so that entries are ranked based on label probability rather than raw keyword similarity, and presented to the user as a semantically relevant list of web results.

Furthermore, labeling application 110 could be used to create a search index for a corpus of documents that provides a label-strength index, returning documents based on a combination of label strengths rather than keyword relevance. Moreover, a hybrid search may be created that weights the keyword index and the label strength index as a weighted combination to determine search rank.

The classification levels disclosed herein were at times binary levels as label and anti-label. The techniques described herein are capable of processing multinomial levels to provide a multinomial label classifier.

Additionally anywhere a search or a web search is described herein, a semantic search based on semantic nearness may be performed instead of a traditional keyword search.

Embodiment 1. A method for determining a correspondence between a class label and a text comprising receiving a candidate text and receiving a label description. The method also comprising using the label description to generate a query. The method also comprising communicating the query to a search engine. The method also comprising receiving from the search engine a text string that is responsive to the query. The method also comprising inputting the text string and the candidate text to a generative model. The method also comprising receiving a generated text from the generative model, the generated text comprising a plurality of tokens and associated probabilities. The method also comprising determining a label probability estimate based on the generated text. The method also comprising outputting an indication whether the candidate text corresponds to the label description based on the label probability estimate.

Embodiment 2. The method of Embodiment 1, wherein the label probability estimate is determined from a token probability of the generated text that corresponds to a label.

Embodiment 3. The method of Embodiment 2, wherein the label is a positive label or an anti-label.

Embodiment 4. The method as in any one of the preceding embodiments, wherein the label probability estimate is determined from a token probability of the generated text that corresponds to a keyword of the label description or a keyword of an anti-label.

Embodiment 5. The method as in any one of the preceding embodiments, wherein a search engine technology for the search engine is selected from a group consisting of a rule-based search, a semantic search based on semantic nearness, or a contextualized search that uses a transformer model.

Embodiment 6. The method as in any one of the preceding embodiments, wherein determining the label probability estimate based on the generated text comprises using a first weight applied to a first label score that is based on the generated text and a second weight applied to a second label score that is based on a second generated text received from a second generative model when the candidate text is input to the second generative model.

Embodiment 7. The method of embodiment 6, wherein the first weight and the second weight are determined by finding a set of stored weights for a different label description that is similar to the label description.

Embodiment 8. A computer-readable media comprising instructions that when executed by a computing device cause the computing device to perform a method for determining a correspondence between a class label and a text comprising receiving a candidate text and receiving a label description. The method also comprising generating a candidate result from a generative model with the candidate text as input to the generative model. The method also comprising generating a positive example result from the generative model with the positive example text as input to the generative model, the positive example text embodying the label description. The method also comprising generating a negative example result from a generative model with a negative example text as input to the generative model, the negative example text embodying a concept opposite to the label description. The method also comprising determining a first ranked score of the positive example result based on a response from submitting the candidate result to a search engine as a query over a corpus comprising the positive example result and the negative example result. The method also comprising determining a second ranked score of the negative example result based on the response from submitting the candidate result to the search engine as the query over a corpus comprising the positive example result and the negative example result. The method also comprising determining a label probability estimate by comparing the first ranked score of the positive example result to the second ranked score of the negative example result. The method also comprising outputting an indication whether the candidate text corresponds to the label description based on the label probability estimate.

Embodiment 9. The media as in any of the preceding embodiments, wherein the search engine is a semantic search engine.

Embodiment 10. The media as in any of the preceding embodiments, wherein the generative model is GPT3 run in zero shot mode.

Embodiment 11. The media as in any of the preceding embodiments, wherein the indication is based on a weighted combination of the label probability estimate and a second label probability estimate calculated by a different method.

Embodiment 12. The media of embodiment 11, wherein the candidate text is a corpus of documents.

Embodiment 13. A system comprising: one or more processors; and one or more computer storage media storing computer-useable instructions that, when used by the one or more processors, cause the one or more processors to perform a method. The method comprising receiving, for a classifier, a training data instance comprising example text associated with a class label. The method also comprising determining a set of priority keywords for the example text. The method also comprising determining a set of priority keywords for the class label. The method also comprising determining a set of context aware keywords from the set of priority keywords and the set of priority keywords. The method also comprising communicating a query comprising the set of context aware keywords to a search engine. The method also comprising receiving from the search engine, in response to the query, a text snippet. The method also comprising generating an augmented training data instance comprising the text snippet and the class label. The method also comprising classifying a candidate text using the classifier trained with the augmented training data instance into a class. The method also comprising outputting an indication that the candidate text corresponds to a label corresponding to the class.

Embodiment 14. The system of embodiment 13, wherein the example text is a positive example of the class label.

Embodiment 15. The system of embodiment 13, wherein the example text is a negative example of the class label.

Embodiment 16. The system as in any one of embodiments 14 or 15, further comprising storing the set of priority keywords for the example text and the set of priority keywords for the class label in a graph structure.

Embodiment 17. The system as in any one of embodiments 14, 15 or 16, wherein the method further comprises obtaining first embeddings for terms of the set of priority keywords for the for example text. The method also comprising obtaining second embeddings for terms of the set of priority keywords for the class label. The method also comprising using an operation on the first embeddings and the second embeddings to determine the context aware keywords.

Embodiment 18. The system of embodiment 17, wherein using the operation comprises calculating cosine similarity between terms of the set of priority keywords for the example text and the terms of the set of priority keywords for the class label.

Embodiment 19. The system as in any one of embodiments 14, 15, 16, 17, or 18, wherein determining the set of context aware keywords comprises filtering the keywords for the example text according to relevance of each term of the set of priority keywords for the example text to the context of the keywords for the class label.

Embodiment 20. The system as in any one of embodiments 14, 15, 16, 17, 18, or 19, further comprising confirming that the text snippet is likely to represent the class label by using a label scoring method that receives the text snippet and the class label and returns an indication that the probability that the text snippet embodies the class label is above a threshold.

Embodiment 21. A method for determining a correspondence between a class label and a text comprising receiving a candidate text. The method further comprising receiving a label description; receiving a positive example text that embodies the label description. The method further comprising receiving a negative example text that embodies a concept that is opposite to the label description. The method further comprising applying a generative model to the positive example text and the candidate text to obtain a positive example result. The method further comprising applying the generative model to the negative example text and the candidate text to obtain a negative example result; applying the generative model to the positive example text, the negative example text, and the candidate text to obtain a baseline result; determining a label probability estimate by comparing an associated log probability of the positive example result to an associated log probability of the negative example result in a context of the baseline result. The method further comprising outputting an indication whether the candidate text corresponds to the label description based on the label probability estimate.

Embodiment 22 the method of embodiment 2, wherein the token probability of the generated text comprises a token probability of a number that corresponds to a label.

Embodiment 23, the method of embodiment 2, wherein the token probability of the generated text comprises a token probability that corresponds to an anti-label.

Embodiment 24, the method of embodiment 2, wherein the label probability estimate is determined from a token probability of the generated text that corresponds to an anti-label.

Embodiment 25, the method of embodiment 2, wherein the label probability estimate is determined from a token probability of a term from the generated text that is a synonym of a keyword of a string label.

Embodiment 26, the method of embodiment 2, wherein the label probability estimate is determined from a token probability of a term from the generated text that is a keyword of a string label.

Embodiment 27, the embodiment of 24 or 25, wherein two token probabilities are combined to form an overall probability estimate.

Embodiment 28, the method of embodiments 25 or 26 wherein the token label probability estimate incorporates probabilities of two terms from the generative text that are keywords of the string label or synonyms of keywords of the string label

What is claimed is:

1. A method for determining a correspondence between a class label and a text comprising:
   receiving a candidate text;
   receiving a label description;
   using the label description to generate a query;
   communicating the query to a search engine;
   receiving from the search engine a text string that is responsive to the query;
   inputting the text string and the candidate text to a generative model;
   receiving a generated text from the generative model, the generated text comprising a plurality of tokens and associated probabilities;
   determining a label probability estimate based on the generated text; and
   outputting an indication whether the candidate text corresponds to the label description based on the label probability estimate.

2. The method of claim 1, wherein the label probability estimate is determined from a token probability of the generated text that corresponds to a label.

3. The method of claim 2, wherein the label is a positive label or an anti-label.

4. The method of claim 1, wherein the label probability estimate is determined from a token probability of the generated text that corresponds to a keyword of the label description or a keyword of an anti-label.

5. The method of claim 1, wherein a search engine technology for the search engine is selected from a group consisting of a rule-based search, a semantic search based on semantic nearness, or a contextualized search that uses a transformer model.

6. The method of claim 1, wherein determining the label probability estimate based on the generated text comprises using a first weight applied to a first label score that is based on the generated text and a second weight applied to a second label score that is based on a second generated text received from a second generative model when the candidate text is input to the second generative model.

7. The method of claim 6, wherein the first weight and the second weight are determined by finding a set of stored weights for a different label description that is similar to the label description.

8. A computer storage media comprising instructions that when executed by a computing device cause the computing device to perform a method for determining a correspondence between a class label and a text comprising:
   receiving a candidate text;
   receiving a label description;
   generating a candidate result from a generative model with the candidate text as input to the generative model;
   generating a positive example result from the generative model with a positive example text as input to the generative model, the positive example text embodying the label description;
   generating a negative example result from a generative model with a negative example text as input to the generative model, the negative example text embodying a concept opposite to the label description;

determining a first ranked score of the positive example result based on a response from submitting the candidate result to a search engine as a query over a corpus comprising the positive example result and the negative example result;

determining a second ranked score of the negative example result based on the response from submitting the candidate result to the search engine as the query over a corpus comprising the positive example result and the negative example result;

determining a label probability estimate by comparing the first ranked score of the positive example result to the second ranked score of the negative example result; and outputting an indication whether the candidate text corresponds to the label description based on the label probability estimate.

9. The media of claim 8, wherein the search engine is a semantic search engine.

10. The media of claim 8, wherein the generative model is GPT3 run in zero shot mode.

11. The media of claim 8, wherein the indication is based on a weighted combination of the label probability estimate and a second label probability estimate calculated by a different method.

12. The media of claim 11, wherein the candidate text is a corpus of documents.

13. A system comprising:
one or more processors; and
one or more computer storage media storing computer-useable instructions that, when used by the one or more processors, cause the one or more processors to perform a method, the method comprising:
receiving, for a classifier, a training data instance comprising example text associated with a class label;
determining a first set of priority keywords for the example text;
determining a second set of priority keywords for the class label;
determining a set of context aware keywords from the first set of priority keywords and the second set of priority keywords;
communicating a query comprising the set of context aware keywords to a search engine;
receiving from the search engine, in response to the query, a text snippet;
generating an augmented training data instance comprising the text snippet and the class label;
classifying a candidate text using the classifier trained with the augmented training data instance into a class; and
outputting an indication that the candidate text corresponds to a label corresponding to the class.

14. The system of claim 13, wherein the example text is a positive example of the class label.

15. The system of claim 13, wherein the example text is a negative example of the class label.

16. The system of claim 12, further comprising storing the first set of priority keywords for the example text and the second set of priority keywords for the class label in a graph structure.

17. The system of claim 12, further comprising:
obtaining first embeddings for terms of the first set of priority keywords for the for example text;
obtaining second embeddings for terms of the second set of priority keywords for the class label; and
using an operation on the first embeddings and the second embeddings to determine the context aware keywords.

18. The system of claim 17, wherein using the operation comprises calculating cosine similarity between terms of the first set of priority keywords for the example text and the terms of the second set of priority keywords for the class label.

19. The system of claim 12, wherein determining the set of context aware keywords comprises filtering the keywords for the example text according to relevance of each term of the first set of priority keywords for the example text to the context of the keywords for the class label.

20. The system of claim 12, further comprising confirming that the text snippet is likely to represent the class label by using a label scoring method that receives the text snippet and the class label and returns an indication that the probability that the text snippet embodies the class label is above a threshold.

* * * * *